United States Patent
Saari et al.

(10) Patent No.: US 11,438,571 B2
(45) Date of Patent: Sep. 6, 2022

(54) LIGHT FIELD IMAGE PROCESSING METHOD FOR DEPTH ACQUISITION

(71) Applicant: AIRY3D INC., Montreal (CA)

(72) Inventors: Jonathan Ikola Saari, Halifax (CA); Ji-ho Cho, Montreal (CA)

(73) Assignee: AIRY3D INC., Montreal (CA)

( * ) Notice: Subject to any disclaimer, the term of this patent is extended or adjusted under 35 U.S.C. 154(b) by 0 days.

(21) Appl. No.: 16/770,317

(22) PCT Filed: Dec. 5, 2018

(86) PCT No.: PCT/CA2018/051554
§ 371 (c)(1),
(2) Date: Jun. 5, 2020

(87) PCT Pub. No.: WO2019/109182
PCT Pub. Date: Jun. 13, 2019

(65) Prior Publication Data
US 2020/0359004 A1    Nov. 12, 2020

Related U.S. Application Data

(60) Provisional application No. 62/594,718, filed on Dec. 5, 2017.

(51) Int. Cl.
*H04N 13/271* (2018.01)
*H04N 13/207* (2018.01)

(52) U.S. Cl.
CPC ....... *H04N 13/271* (2018.05); *H04N 13/207* (2018.05)

(58) Field of Classification Search
USPC ....................................................... 382/154
See application file for complete search history.

(56) References Cited

U.S. PATENT DOCUMENTS

| 5,513,025 A | 4/1996 | Watanabe et al. |
| 8,530,811 B2 | 9/2013 | Molnar et al. |

(Continued)

FOREIGN PATENT DOCUMENTS

| CA | 2691083 A1 | 12/2008 |
| WO | 2007/031992 A1 | 3/2007 |

(Continued)

OTHER PUBLICATIONS

Suleski, Thomas J. Generation of Lohmann images from binary-phase Talbot array illuminators Applied optics, 1997, vol. 36, No. 20, p. 4686-4691.

(Continued)

*Primary Examiner* — Behrooz M Senfi
(74) *Attorney, Agent, or Firm* — McDonnell Boehnen Hulbert & Berghoff LLP

(57) ABSTRACT

Techniques for capturing three-dimensional image data of a scene and processing light field image data obtained by an optical wavefront sensor in 3D imaging applications are provided. The disclosed techniques provide a depth map of an observable scene from light field information about an optical wavefront emanating from the scene, and make use of color filters forming a color mosaic defining a primary color and one or more secondary colors, and color radial transfer functions calibrated to provide object distance information from the spatio-spectrally sampled pixel data.

25 Claims, 15 Drawing Sheets

(56) References Cited

U.S. PATENT DOCUMENTS

| | | | |
|---|---|---|---|
| 8,767,047 | B2 | 7/2014 | Molnar et al. |
| 8,809,758 | B2 | 8/2014 | Molnar et al. |
| 2003/0067460 | A1* | 4/2003 | Tomono .................. G02B 30/27 |
| | | | 348/E13.043 |
| 2006/0072005 | A1 | 4/2006 | Thomas-Wayne |
| 2010/0165134 | A1 | 7/2010 | Dowski et al. |
| 2013/0195353 | A1 | 8/2013 | Uslubas |
| 2014/0313368 | A1 | 10/2014 | Tanaka et al. |
| 2015/0042858 | A1 | 2/2015 | Kokobun et al. |
| 2015/0061065 | A1 | 3/2015 | Gill et al. |
| 2015/0125943 | A1 | 5/2015 | Molnar et al. |
| 2015/0138402 | A1 | 5/2015 | Ng et al. |
| 2016/0323566 | A1 | 11/2016 | Vdovin |
| 2020/0359004 | A1* | 11/2020 | Saari ..................... H04N 13/257 |
| 2022/0057550 | A1* | 2/2022 | Saari ................. H01L 27/14607 |

FOREIGN PATENT DOCUMENTS

| | | | |
|---|---|---|---|
| WO | 2011/008300 | A1 | 1/2011 |
| WO | 2016/017107 | A1 | 2/2016 |
| WO | 2017/210781 | A1 | 12/2017 |

OTHER PUBLICATIONS

Noponen, Eero et Turunen, Jari. Electromagnetic theory of Talbot imaging Optics communications, 1993, vol. 98, No. 1-3, p. 132-140.
Written Opinion of the International Searching Authority of PCT/CA2020/050760, dated Aug. 11, 2020, 4 pages.
International Search Report of PCT/CA2020/050760, dated Aug. 11, 2020, 3 pages.
Supplementary European Search Report of EP 17 80 9494, dated Jan. 21, 2020, 7 pages.
Wang, Albert, Gill, Patrick R., et Molnar, Alyosha. An angle-sensitive CMOS imager for single-sensor 3D photography In : 2011 IEEE International Solid-State Circuits Conference IEEE, 2011 p. 412-414.
International Search Report dated Feb. 20, 2019, issued in connection with International Application No. PCT/CA2018/051554, filed on Dec. 5, 2018, 2 pages.
Written Opinion dated Feb. 20, 2019, issued in connection with International Application No. PCT/CA2018/051554, filed on Dec. 5, 2018, 4 pages.

\* cited by examiner

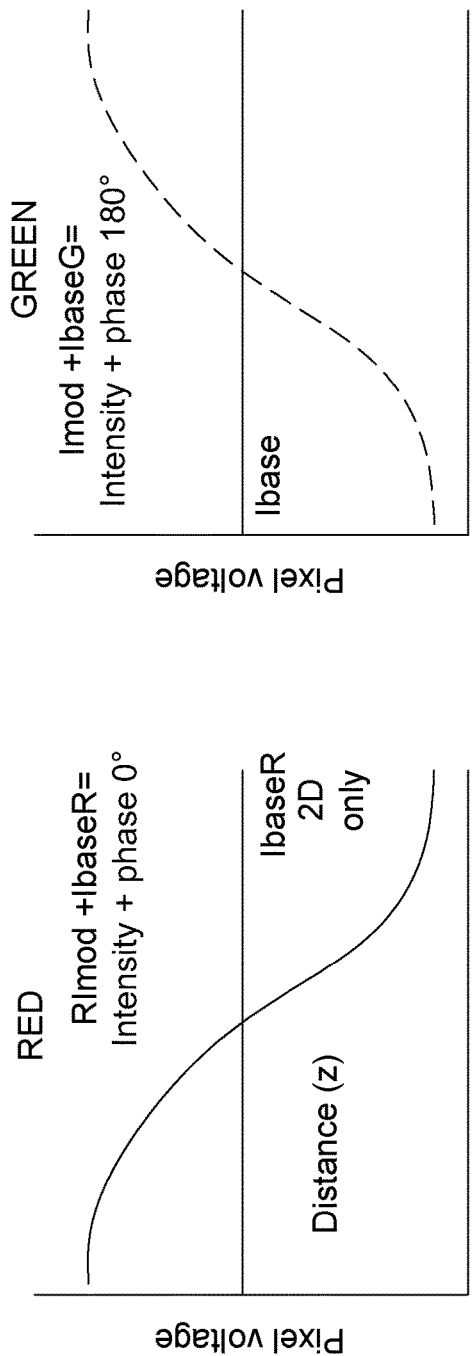
FIG. 11A
FIG. 11B
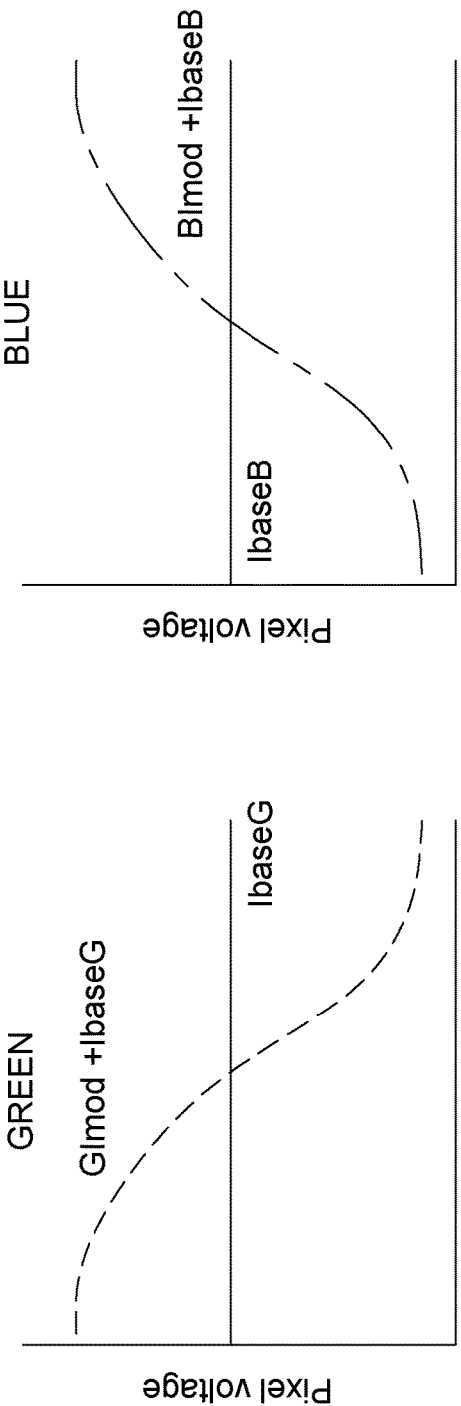
FIG. 11C
FIG. 11D

LIGHT FIELD IMAGE PROCESSING METHOD FOR DEPTH ACQUISITION

This application is a U.S. National Phase Application under 35 U.S.C. § 371 of International Application No. PCT/CA2018/051554, filed Dec. 5, 2018, which claims priority to U.S. Provisional Application No. 62/594,718, filed Dec. 5, 2017, the disclosures of each of which are incorporated herein by reference in their entirety.

TECHNICAL FIELD

The general technical field relates to imaging systems and methods, more particularly, to a light field imaging device and image processing method for depth acquisition and three-dimensional (3D) imaging.

BACKGROUND

Traditional imaging hardware involves the projection of complex three-dimensional (3D) scenes onto simplified two-dimensional (2D) planes, forgoing dimensionality inherent in the incident light. This loss of information is a direct result of the nature of square-law detectors, such as charge-coupled devices (CCD) or complementary metal-oxide-semiconductor (CMOS) sensor arrays, which can only directly measure the time-averaged intensity I of the incident light, not its phase, $\varphi$, or wave vector, k, or angular frequency, $\omega$:

$$I \sim \langle E(t) \rangle; \text{ where } E(t) = E_0 \cos(\vec{k} \cdot \vec{r} - \omega t + \varphi). \quad (1)$$

Working within this constraint, plenoptic cameras are forced to recover depth information through either the comparative analysis of multiple simultaneously acquired images, complicated machine learning and/or reconstruction techniques, or the use of active illuminators and sensors. Plenoptic cameras generally describe a scene through the "plenoptic function" which parameterizes a light field impingent on an observer or point by:

$$P = P(x, y, \lambda, t, V_x, V_y, V_z, p), \quad (2)$$

where the x and y coordinates define a certain image plane at time t, for wavelength $\lambda$, and polarization angle p, as witnessed by an observer at location $(V_x, V_y, V_z)$. While they may be single- or multi-sensor based systems, current plenoptic cameras can rely, at minimum, solely on the intensity of light detected by any given pixel of a sensor array. More practically, existing solutions, such as stereovision or microlensing, sacrifice overall image quality and sensor footprint by employing multiple sensors or sensor segmentation to accommodate the various fields of view required to discern depth.

Random binary occlusion masks and coded apertures are other existing approaches that provide single-sensor solutions with minimal impact on packaging or overall footprint. However, despite advances in compressed sensing and non-linear reconstruction techniques, these solutions remain hindered by the massive image dictionaries and computational expense involved.

Time-of-flight and structured-light based techniques actively illuminate a scene with pulsed, patterned, or modulated continuous-wave infrared light, and determine depth via the full return-trip travel time or subtle changes in the illuminated light pattern. While these techniques do not suffer from image segmentation, they generally require additional active infrared emitters and detectors which both increase power consumption as well as overall device footprint. Similarly, these techniques tend to be sensitive to interfering signals, specular reflections, and ambient infrared light, thus limiting their viability outdoors.

While the technical limitations and complexities of the various image capture hardware described above represent significant barriers to the proliferation of light field capture technology, the complexity of processing light field images remains a significant gating factor. To begin, a raw and uncompressed traditional two-dimensional (x, y) image at modern camera resolutions can be on the order of 50 megabytes in size. An equivalent four-dimensional (x, y, u, v) light field image would be orders of magnitude larger, nearing gigabytes. Such data size pushes the limits of traditional computing and mobile phone systems in terms of bus bandwidth and memory transfer rates as well as pure storage space availability. Therefore, practical light field devices would require immense and efficient compression to function using modern system on chip architectures typical of mobile devices.

Stereovision approaches inherently require complex computational steps including feature matching and rectification before light field scenes can be reconstructed. Microlensing approaches, due to the hardware-induced, down-sampled nature of the image, require intensive non-linear reconstruction algorithms which scale exponentially in computational cost with the number of pixels in the image to return an image at the native camera resolution. Time-of-flight and other active illumination approaches often do not capture an intensity image and require a secondary mono or color capture device. The captured depth map then needs to be stitched with the intensity image before light field scenes can be processed. Infrared camera systems often have very low resolution relative to the intensity capture device. This hardware limitation requires further software-based up-sampling to match the depth map spatial resolution to the spatial resolution of the intensity image.

Challenges therefore remain in the development of techniques for acquiring and processing 3D light field images that can combine direct hardware compression and efficient computational reconstruction algorithms.

SUMMARY

The present description generally relates to light field imaging techniques for depth mapping and other 3D imaging applications.

The present description provides methods for processing light field image data obtained by an optical wavefront sensor in 3D imaging applications. More particularly, the disclosed method can be used for generating or building a 3D or depth image of an observable scene from light field information about an optical wavefront emanating from a scene.

In accordance with one aspect, there is provided a method of capturing three-dimensional image data of a scene, the method comprising:
a) diffracting an optical wavefront originating from the scene according to a diffraction grating pattern having a grating period along a grating axis, to generate a diffracted optical wavefront;
b) detecting the diffracted optical wavefront in a near-field regime using a pixel array comprising a plurality of light-sensitive pixels each associated with a color filter, thereby obtaining pixel data, the color filters forming a color mosaic defining a primary color and one or more secondary colors arranged such that different neighboring pixels associated with the primary color detect different spatial parts of the diffracted optical wavefront over a full cycle of said diffracted optical wavefront, the pixel array having a pixel pitch along the grating axis that is smaller than the grating period;

c) parsing the pixel data according to said primary and secondary colors into corresponding primary and secondary color channels;

d) determining a main base component and a main modulating component of an intensity profile of the diffracted optical wavefront associated with the primary color channel;

e) determining a secondary base component and a secondary modulating component of intensity profiles of the diffracted optical wavefronts associated with each of the secondary channels;

f) reconstructing a 2D image of the scene using the main and secondary base components; and g) creating a depth map of the scene using at least one color radial transfer function calibrated to provide object distance information from the modulating component of an associated one of said color channels.

In some implementations of this method, each color radial transfer function relates the intensity profile of the diffracted optical wavefront of the associated color channel to a corresponding focal plane of an image capture device used for said detecting step. The object distance information may be obtained from a relation such that Object(Z) ~2D Image× CRTF, where z is the distance of a given object in the scene from the focal plane of the image capture device, 2D Image is the 2D image reconstructed at step f), and CRTF are the radial transfer functions obtained from a fitted 5D function of polar coordinates $r$, $\phi$, $\theta$ from the focal plane, a pixel number n, and an incident wavelength $\lambda$.

In some implementations of this method, the determining a secondary base component and a secondary modulating component of step e) comprised using the intensity profile of the diffracted optical wavefront associated with the primary color channel for neighboring banks of said pixels to determine if said neighboring banks have a constructive or a destructive interference offset.

In some implementations of this method, the reconstructing a 2D image of step f) comprises normalizing the secondary base components using the main base components.

In some implementations of this method, the reconstructing a 2D image of step f) comprises:
using the main modulating component and the associated color radial transfer function to obtain said object distance information; and
using the secondary modulating components and the associated color radial transfer functions in view of said object distance information to compensate for artefacts from the diffraction of the optical wavefront in said 2D image.

In some implementations of this method, the creating of a depth map of step g) comprises creating a coarse depth map using the main modulating component and the associated color radial transfer function.

In some implementations of this method, the creating a coarse depth map comprises:
obtaining relative phase information for the primary color channel from the main modulating component associated thereto; and
obtaining absolute phase information for the primary color channel from a comparison of said relative phase information to the color radial transfer function associated with said primary color channel.

The creating of a depth map may also comprise correcting said coarse depth map using the one or more secondary modulating components and the associated color radial transfer functions.

In some implementations of this method, correcting said coarse depth map comprises:
obtaining relative phase information for each secondary color channel from the main modulating component associated thereto; and
obtaining absolute phase information for each secondary color channel from a comparison of said relative phase information to the color radial transfer function associated with the associated secondary color channel.

In some implementations of this method, the color mosaic defines two of said secondary colors.

In some implementations of this method, the primary color channel is a green color channel, the secondary color channels are a red channel and a blue channel, and said associated color radial transfer functions respectively defined a green radial transfer function GRTF, a red radial transfer function RRTF and a blue radial transfer function BRTF. The color mosaic may be a Bayer pattern. The creating of a depth map of step g) may comprise:

i. creating a coarse depth map by:
obtaining relative phase information for the green color channel from the main modulating component associated thereto; and
obtaining absolute phase information for the green color channel from a comparison of said relative phase information to the green radial transfer function GRTF; and ii. correcting said coarse depth map by:
obtaining relative phase information for the red and blue channels from the main modulating component associated thereto; and
obtaining absolute phase information for the red and blue channels from a comparison of said relative phase information to the red and blue radial transfer functions RRTF and BRTF.

In accordance with another aspect, there is provided a non-transitory computer readable storage medium having stored thereon computer executable instructions for obtaining three-dimensional image data of a scene from a diffracted optical wavefront originating from the scene and diffracted according to a diffraction grating pattern having a grating period along a grating axis, the diffracted optical wavefront having been diffracted in a near-field regime using a pixel array comprising a plurality of light-sensitive pixels each associated with a color filter, thereby obtaining pixel data, the color filters forming a color mosaic defining a primary color and one or more secondary colors arranged such that different neighboring pixels associated with the primary color detect different spatial parts of the diffracted optical wavefront over a full cycle of said diffracted optical wavefront, the pixel array having a pixel pitch along the grating axis that is smaller than the grating period, the computer executable instructions, when executed by a processor having received the pixel data, cause the processor to perform the following steps:

a) parsing the pixel data according to said primary and secondary colors into corresponding primary and secondary color channels;

b) determining a main base component and a main modulating component of an intensity profile of the diffracted optical wavefront associated with the primary color channel;

c) determining a secondary base component and a secondary modulating component of intensity profiles of the diffracted wavefront associated with each of the secondary channels;
d) reconstructing a 2D image of the scene using the main and secondary base components; and
e) creating a depth map of the scene using at least one color radial transfer function calibrated to provide object distance information from the modulating component of an associated one of said color channels.

In some implementations, each color radial transfer function relates the intensity profile of the diffracted optical wavefront of the associated color channel to a corresponding focal plane of an image capture device used for said detecting step. The object distance information is obtained from a relation such that Object(Z) ~2D Image×CRTF, where z is the distance of a given object in the scene from the focal plane of the image capture device, 2D Image is the 2D image reconstructed at step d), and CRTF are the radial transfer functions. The value of CRTF is obtained from a fitted function of polar coordinates r, $\phi$, $\theta$ from the focal plane, a pixel number n, and an incident wavelength $\lambda$.

In some implementations, the determining a secondary base component and a secondary modulating component of step c) comprised using the intensity profile of the diffracted optical wavefront associated with the primary color channel for neighboring banks of said pixels to determine if said neighboring banks have a constructive or a destructive interference offset.

In some implementations, the reconstructing a 2D image of step d) comprises normalizing the secondary base components using the main base component.

In some implementations, the reconstructing a 2D image of step d) comprises:
  using the main modulating component and the associated color radial transfer function to obtain said object distance information; and
  using the secondary modulating components and the associated color radial transfer functions in view of said object distance information to compensate for artefacts from the diffraction of the optical wavefront in said 2D image.

In some implementations, the creating of a depth map of step e) comprises creating a coarse depth map using the main modulating component and the associated color radial transfer function. The creating a coarse depth map may comprise:
  obtaining relative phase information for the primary color channel from the main modulating component associated thereto; and
  obtaining absolute phase information for the primary color channel from a comparison of said relative phase information to the color radial transfer function associated with said primary color channel.

In some implementations, the creating of a depth map comprises correcting said coarse depth map using the one or more secondary modulating components and the associated color radial transfer function. Correcting said coarse depth map may comprise:
  obtaining relative phase information for each secondary color channel from the main modulating component associated thereto; and
  obtaining absolute phase information for each secondary color channel from a comparison of said relative phase information to the color radial transfer function associated with the associated secondary color channel.

In some implementations, the color mosaic defines two of said secondary colors.

In some implementations, the primary color channel is a green color channel, the secondary color channels are a red channel and a blue channel, and said associated color radial transfer functions respectively defined a green radial transfer function GRTF, a red radial transfer function RRTF and a blue radial transfer function BRTF. The color mosaic may be a Bayer pattern. The creating of a depth map of step e) may comprise:
  i. creating a coarse depth map by:
    obtaining relative phase information for the green color channel from the main modulating component associated thereto; and
    obtaining absolute phase information for the green color channel from a comparison of said relative phase information to the green radial transfer function; and
  ii. correcting said coarse depth map by:
    obtaining relative phase information for the red and blue channels from the main modulating component associated thereto; and
    obtaining absolute phase information the red and blue channels from a comparison of said relative phase information to the red and blue radial transfer functions.

In accordance with another aspect, there is provided a method of capturing three-dimensional image data of a scene, the method comprising:
a) diffracting an optical wavefront originating from the scene according to a diffraction grating pattern having a grating period along a grating axis to generate a diffracted wavefront;
b) detecting the diffracted optical wavefront in a near-field regime using a pixel array comprising a plurality of light-sensitive pixels each associated with a color filter, thereby obtaining pixel data, the color filters forming a color mosaic defining a primary color and one or more secondary colors;
c) parsing the pixel data according to said primary and secondary colors into corresponding primary and secondary color channels;
d) determining a main base component and a main modulating component of an intensity profile of the diffracted optical wavefront associated with the primary color channel;
e) determining a secondary base component and a secondary modulating component of intensity profiles of the diffracted wavefront associated with each of the secondary channels;
f) creating a depth map of the scene using at least one color radial transfer function calibrated to provide object distance information from the modulating component of an associated one of said color channels.

In some implementations, the pixel array has a pixel pitch along the grating axis that is the same or greater than the grating period said method further comprising a preliminary step of focusing the optical wavefront originating from the scene using chromatically dependent focusing optics.

In some implementations, each color radial transfer function relates the intensity profile of the diffracted optical wavefront of the associated color channel to a corresponding focal plane of an image capture device used for said detecting step.

In some implementations, the creating of a depth map of step f) comprises creating a coarse depth map using the main modulating component and the associated color radial transfer function. Creating a coarse depth map may comprise:

obtaining relative phase information for the primary color channel from the main modulating component associated thereto; and obtaining absolute phase information for the primary color channel from a comparison of said relative phase information to the color radial transfer function associated with said primary color channel.

In some implementations, creating of a depth map comprises correcting said coarse depth map using the one or more secondary modulating components and the associated color radial transfer function. Correcting said coarse depth map may comprise:

obtaining relative phase information for each secondary color channel from the main modulating component associated thereto; and obtaining absolute phase information for each secondary color channel from a comparison of said relative phase information to the color radial transfer function associated with the associated secondary color channel.

In some implementations, the primary color channel is a green color channel, the secondary color channels are a red channel and a blue channel, and said associated color radial transfer functions respectively defined a green radial transfer function GRTF, a red radial transfer function RRTF and a blue radial transfer function BRTF. The color mosaic may be a Bayer pattern. The creating of a depth map of step f) may comprise:

i. creating a coarse depth map by:
obtaining relative phase information for the green color channel from the main modulating component associated thereto; and
obtaining absolute phase information for the green color channel from a comparison of said relative phase information to the green radial transfer function; and
ii. correcting said coarse depth map by:
obtaining relative phase information for the red and blue channels from the main modulating component associated thereto; and
obtaining absolute phase information for the red and blue channels from a comparison of said relative phase information to the red and blue radial transfer functions, respectively, and to said green radial transfer function.

In accordance with yet another aspect, there is provided a non-transitory computer readable storage medium having stored thereon computer executable instructions for obtaining three-dimensional image data of a scene from a diffracted optical wavefront originating from the scene and diffracted according to a diffraction grating pattern having a grating period along a grating axis, the diffracted optical wavefront having been diffracted in a near-field regime using a pixel array comprising a plurality of light-sensitive pixels each associated with a color filter, thereby obtaining pixel data, the color filters forming a color mosaic defining a primary color and one or more secondary colors, the computer executable instructions, when executed by a processor having received the pixel data, cause the processor to perform the following steps:

a) parsing the pixel data according to said primary and secondary colors into corresponding primary and secondary color channels;
b) determining a main base component and a main modulating component of an intensity profile of the diffracted optical wavefront associated with the primary color channel;
c) determining a secondary base component and a secondary modulating component of intensity profiles of the diffracted wavefront associated with each of the secondary channels;
d) creating a depth map of the scene using at least one color radial transfer function calibrated to provide object distance information from the modulating component of an associated one of said color channels.

In some implementations, the pixel array has a pixel pitch along the grating axis that is the same or greater than the grating period said method further comprising a preliminary step of focusing the optical wavefront originating from the scene using chromatically dependent focusing optics.

In some implementations, each color radial transfer function relates the intensity profile of the diffracted optical wavefront of the associated color channel to a corresponding focal plane of an image capture device used for said detecting step.

In some implementations, the creating of a depth map of step d) comprises creating a coarse depth map using the main modulating component and the associated color radial transfer function.

In some implementations, creating a coarse depth map comprises:

obtaining relative phase information for the primary color channel from the main modulating component associated thereto; and obtaining absolute phase information for the primary color channel from a comparison of said relative phase information to the color radial transfer function associated with said primary color channel.

In some implementations, the creating of a depth map comprises correcting said coarse depth map using the one or more secondary modulating components and the associated color radial transfer function. Correcting said coarse depth map may comprise:

obtaining relative phase information for each secondary color channel from the main modulating component associated thereto; and obtaining absolute phase information for each secondary color channel from a comparison of said relative phase information to the color radial transfer function associated with the associated secondary color channel.

In some implementations, the primary color channel is a green color channel, the secondary color channels are a red channel and a blue channel, and said associated color radial transfer functions respectively defined a green radial transfer function GRTF, a red radial transfer function RRTF and a blue radial transfer function BRTF. The color mosaic may be a Bayer pattern.

In some implementations, the creating of a depth map of step d) comprises:

i. creating a coarse depth map by:
obtaining relative phase information for the green color channel from the main modulating component associated thereto; and
obtaining absolute phase information for the green color channel from a comparison of said relative phase information to the green radial transfer function; and
ii. correcting said coarse depth map by:
obtaining relative phase information for the red and blue channels from the main modulating component associated thereto; and
obtaining absolute phase information for the red and blue channels from a comparison of said relative phase information to the red and blue radial transfer functions, respectively, and to said green radial transfer function.

In accordance with an aspect, there is provided an image processing method for depth acquisition. The method allows processing light field image data representing a discretized sampling of a continuous light field or wavefront incident from an observable scene. The light field image data forms an array of image data pixels representing a spatial distribution of the incident wavefront having been diffracted by a diffraction grating assembly and, optionally, subsequently spectrally filtered according to a mosaic color pattern mapped to the array of image data pixels. The diffraction grating assembly is used to create a diffracted wavefront having an angularly dependent diffractive pattern related to the curvature and rate of spread of the incident wavefront, which may be caused by a focusing optical element provided in front of the diffracting grating assembly. In color applications, the diffracted wavefront can be further spectrally filtered by an underlying color filter array into two or more discrete spectral components. The intensity of this spectrally filtered, diffracted wavefront is finally measured by the underlying pixels to provide the light field image data, typically arranged into an image frame of rows and columns of data pixels. This light field image data will generally be a collection of intensity, spectral, and angular information about the original wavefront, sampled at the pixel level. The present image processing method can process this light field image data to acquire a depth map and reconstruct a light field image of the observed scene.

In some implementations, the image processing method can include at least some of the following steps:

Splitting the image data pixels into a plurality of individual spectral or color channels, in accordance with mosaic color pattern. The color channels can include at least one main color channel and at least one secondary color channel, each color channel containing a portion of the image data pixels. The main color channel includes pixels that sample different spatial parts (i.e., phase components) of the diffracted wavefront over a full cycle, unlike the secondary color channel. By way of example, in one possible implementation, the image data pixels can be split into green, red and blue channels, where the green channel is doubly sampled compared to the red and blue channels (Bayer pattern) and act as the main channel while either of or both the red and blue channels act as a secondary channel.

Determining a base component and a modulating component associated with the main color channel. In general, the light field image data can be expressed as a modulated function including a base component and a modulating component. The base component represents the non-phase-dependent optical wavefront from which a conventional 2D image of a scene can be obtained, and the modulating component results from the phase-dependent perturbation to the incident wavefront created by the diffraction grating assembly.

Determining a base component and a modulating component of the at least one secondary channel from the those of the main channel.

Reconstructing a full color 2D image of the scene using the main and secondary base components, using the main base component as a normalizing basis set.

Creating a depth map from the main modulating component, and, optionally, the secondary modulating component(s).

In some implementations, the modulating components can provide angular or phase information about the incident optical wavefront, from which a depth map can be generated. More particularly, the angular phase contained in the modulating components and depth can be linked via the rate of spread or tilt of the wavefront caused by the lens system of the image capture device. Therefore, in some implementations, knowledge of the focal position of the image capture device is needed for absolute depth mapping, but not for relative depth mapping.

The wavefront spread information contained in the modulating components can be compared to pre-calibrated, sensor-specific chromatic radial transfer functions (CRTFs) to obtain absolute phase information from the relative phase information provided by the modulating components. In some implementations, the relative phase information provided by the modulating component can be mapped to a wavefront spread using the CRTFs, this wavefront spread itself corresponding to an object position relative to the focal plane of the image capture device. In some implementations, a coarse depth map can be provided by the main modulating component, which coarse depth map can be corrected or enhanced by the secondary modulating component.

In some conventional techniques, depth mapping can be achieved by generating a disparity between two different light field views in each plane, much like a stereo camera. That is, such conventional techniques do not give depth naturally, but rather calculate depth light field information, such as from disparity or parallax between two or more planes. In contrast, in some of the present techniques, the angular spread of an object's wavefront in polar coordinates is measured in polar coordinates, which can directly map angular spread to depth without having to generate disparity through light field comparison, though it is not precluded to do so as well. In other words, some of the present techniques capture depth information inherently, and then use this depth information to construct light field images.

It is to be noted that other method and process steps may be performed prior, during or after the above-described steps. The order of one or more of the steps may also differ, and some of the steps may be omitted, repeated and/or combined, depending on the application.

In accordance with another aspect, there is provided a non-transitory computer readable storage medium with a computer program stored thereon, wherein the computer program is operable to process and/or characterize light field image data, wherein the computer program instructs one or more processors to perform various steps of the methods disclosed herein.

Other features and advantages of the present description will become more apparent upon reading of the following non-restrictive description of specific embodiments thereof, given by way of example only with reference to the appended drawings.

BRIEF DESCRIPTION OF THE DRAWINGS

FIGS. 11a to 11D illustrate example of the measured pixel voltage on each pixel shown on FIG. 10.

DETAILED DESCRIPTION

Figure 1:
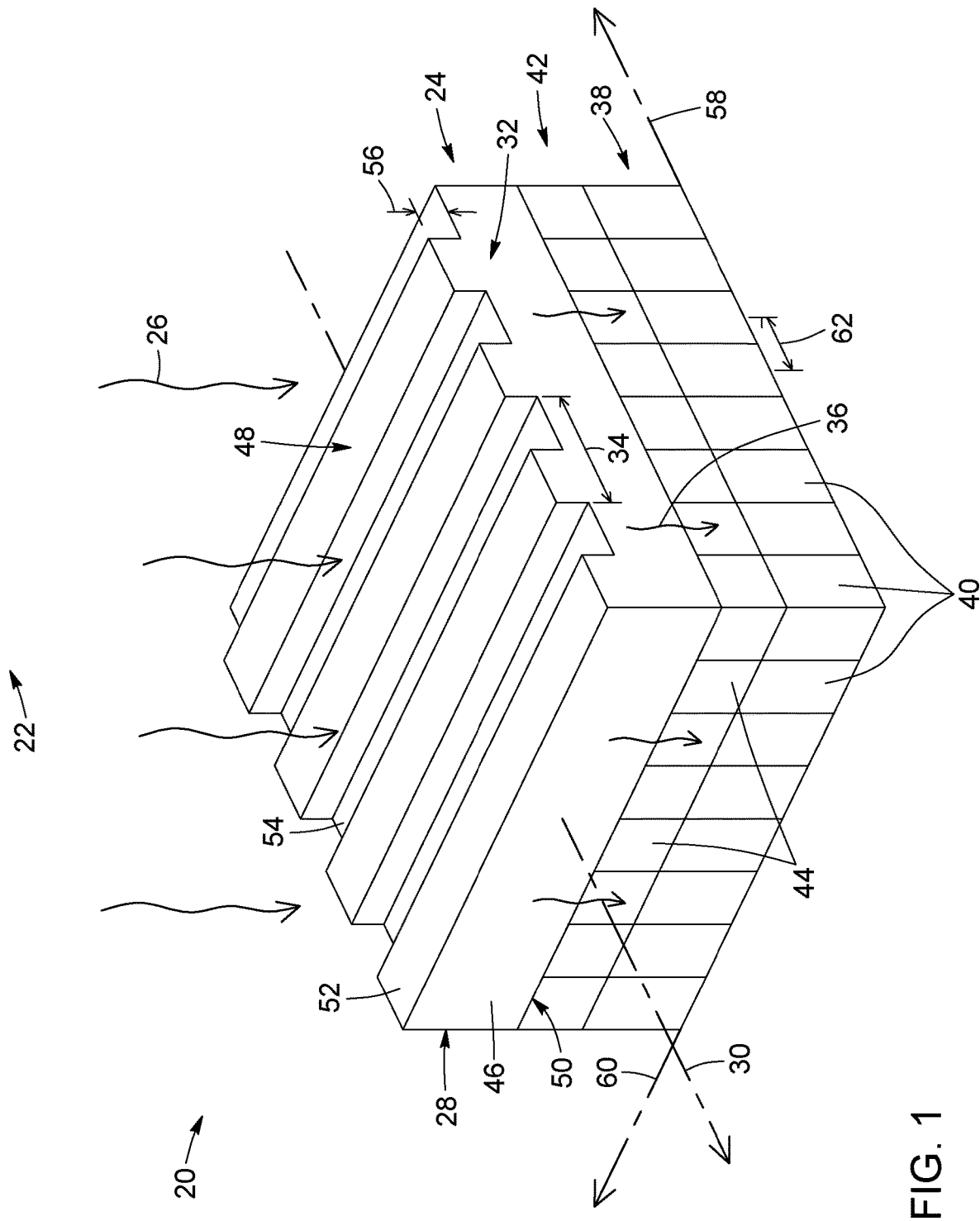
FIG. 1 is a schematic perspective view of an example of a light field capture device that can be used to obtain light field image data to be processed using the present techniques.

In the present description, similar features in the drawings have been given similar reference numerals, and, to not unduly encumber the figures, some elements may not be indicated on some figures if they were already identified in a preceding figure. It should also be understood that the elements of the drawings are not necessarily depicted to scale, since emphasis is placed upon clearly illustrating the elements and structures of the present embodiments.

In the present description, and unless stated otherwise, the terms "connected" and "coupled", as well as variants and derivatives thereof, refer to any connection or coupling, either direct or indirect, between two or more elements. The connection or coupling between the elements may be mechanical, optical, electrical, operational or a combination thereof. It will also be appreciated that positional descriptors and other like terms indicating the position or orientation of one element with respect to another element are used herein for ease and clarity of description and should, unless otherwise indicated, be taken in the context of the figures and should not be considered limiting. It will be understood that such spatially relative terms are intended to encompass different orientations in use or operation of the present embodiments, in addition to the orientations exemplified in the figures. More particularly, it is to be noted that in the present description, the terms "over" and "under" in specifying the relative spatial relationship of two elements denote that the two elements can be either in direct contact with each other or separated from each other by one or more intervening elements. In the present description, the terms "a", "an" and "one" are defined to mean "at least one", that is, these terms do not exclude a plural number of items, unless specifically stated otherwise.

The present description generally relates to techniques for capturing three-dimensional image data of a scene and processing light field image data obtained by an optical wavefront sensor in 3D imaging applications. More particularly, the present description discloses techniques for generating or building a 3D or depth image or a combined 2D image and depth map of an observable scene from light field information about an optical wavefront emanating from the scene.

In the present description, the term "providing" is used broadly and refers to, but is not limited to, making available for use, acquiring, obtaining, accessing, supplying, receiving, assigning and retrieving. By way of example, in some implementations, the provision of the light field image data to be processed can involve the act of directly acquiring the light field image data using a light field capture device and making available the light field image data thus acquired. However, in other implementations, the provision of the light field image data can involve the act of retrieving or receiving previously acquired light field image data, for example from a database or a storage medium.

In some implementations, the present techniques involve the specific manipulation and comparison of the chromatic dependence of diffraction by means of one or more diffractive optical elements paired with an appropriate chromatic encoding mechanism, as well as its use in 3D imaging. In some implementations, the light field image data to be processed into a 3D image forms an array of image data pixels representing a spatio-spectral distribution of a light field after diffraction by a diffraction grating and spectral filtering according to a mosaic color pattern.

In some implementations, the techniques disclosed herein are sensitive to not only the intensity of an optical wavefront originating from an observable scene, but also the wavelength, through a specific spatio-spectral subsampling of a generated interference or diffraction grating pattern, allowing for direct measurement of the chromatic dependence of diffraction, the angle of incidence, the phase, and the polarization of the optical wavefront. Therefore, light field imaging devices, for example depth cameras, can acquire more information than traditional cameras, which typically record only light intensity. The raw image data captured by light field capture devices can be used or processed in a variety of ways to provide multiple functions including, but not limited to, 3D depth map extraction, 3D surface reconstruction, image refocusing, and the like. Depending on the application, the light field image data of an observable scene can be acquired as one or more still images or as a video stream. That is, each individual captured frame generally contains all relevant information to generate an individual light field scene. These frames, and their subsequent light field scenes, can be combined and played sequentially to act like a video stream.

The present techniques can be used in imaging applications that require or can benefit from enhanced depth sensing and other 3D imaging capabilities, for example to allow a user to change the focus, the point of view and/or the depth of field of a captured image of a scene. Non-limiting typical observable scene examples could include: a person taking a selfie using their front facing camera on a mobile phone, a car approaching an intersection with pedestrians crossing and a stop sign, a car trying to park in a tight parking spot, an individual's hands gesturing to interact with a virtual or augmented reality scene, and the like.

The present techniques can be applied to or implemented in various types of 3D imaging systems and methods including, without limitation, light field imaging applications using plenoptic descriptions, ranging applications through the comparative analysis of the chromatic dependence of diffraction, and single-sensor single-image depth acquisition applications. Non-exhaustive advantages and benefits of certain implementations of the present techniques can include: compatibility with passive sensing modalities that employ less power to perform their functions; compatibility with single-sensor architectures having reduced footprint; enablement of depth mapping functions while preserving 2D performance; simple and low-cost integration into existing image sensor hardware and manufacturing processes; compatibility with conventional CMOS and CCD image sensors; and elimination of the need for multiple components, such as dual cameras or cameras equipped with active lighting systems for depth detection.

In the present description, the terms "light" and "optical" are used to refer to radiation in any appropriate region of the electromagnetic spectrum. More particularly, the terms "light" and "optical" are not limited to visible light, but can also include invisible regions of the electromagnetic spectrum including, without limitation, the terahertz (THz), infrared (IR) and ultraviolet (UV) spectral bands. In some implementations, the terms "light" and "optical" can encompass electromagnetic radiation having a wavelength ranging from about 175 nanometers (nm) in the deep ultraviolet to about 300 micrometers (µm) in the terahertz range, for example from about 400 nm at the blue end of the visible spectrum to about 1550 nm at telecommunication wavelengths, or between about 400 nm and about 650 nm to match the spectral range of typical red-green-blue (RGB) color filters. Those skilled in the art will understand, however, that these wavelength ranges are provided for illustrative purposes only and that the present techniques may operate beyond these ranges.

In the present description, the terms "color" and "chromatic", and variants and derivatives thereof, are used not only in their usual context of human perception of visible electromagnetic radiation (e.g., red, green and blue), but also, and more broadly, to describe spectral characteristics (e.g., diffraction, transmission, reflection, dispersion, absorption) over any appropriate region of the electromagnetic spectrum. In this context, and unless otherwise specified, the terms "color" and "chromatic" and their derivatives can be used interchangeably with the term "spectral" and its derivatives.

The present techniques can be used to process raw light field image data captured with various types of light field capture devices. Non-limiting examples of such devices are described below and illustrated in FIGS. 1 to 11. Other non-limiting examples of light field capture devices capable of acquiring light field image data that can be processed using the image processing techniques described herein are disclosed in co-assigned international PCT patent application No. PCT/CA2017/050686, the contents of which are incorporated herein by reference in their entirety.

According to another aspect of the invention, there is provided a computer readable memory storing computer executable instructions thereon that, when executed by a computer, can perform various steps of the image processing method disclosed herein.

As used herein, the term "computer readable memory" is intended to refer to a non-transitory and tangible computer product that can store and communicate executable instructions for the implementation of various steps of the image processing method disclosed herein. The computer readable memory can be any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or other non-transitory memory technologies. A plurality of such storage devices may be provided, as can be understood by those skilled in the art. The computer readable memory may be associated with, coupled to or included in a computer configured to execute instructions stored in the computer readable memory in connection with various functions associated with the computer.

As used herein, the term "computer" refers broadly to any computing or processing unit or device including electronic circuitry that can control and execute, at least partly, instructions required to perform various steps of the image processing method disclosed herein. The computer can be embodied by a general-purpose computer, a central processing unit (CPU), a microprocessor, a microcontroller, a processing core, or any other processing resource or any combination of such computer or processing resources configured to operate collectively as a processing unit. For example, in some implementations, the processing unit implementing the image processing method described herein can be an image signal processor (ISP) or a digital signal processor (DSP) running on a system on a chip (SoC), a graphics processing unit (GPU), a field-programmable gate array (FPGA), or a combination thereof.

It will be readily understood that in some implementations, all of the steps of the processing method disclosed herein may be accomplished by a single processor, whereas in other implementations one or more of the steps of such a method may be performed on different processors or at different physical locations. Furthermore, while in some implementations the processing of the image data may be performed by a same device also performing the acquisition of the light field, for example a phone or tablet, in other implementation the light field image data may be transmitted to a different location or device and processed separately.

In some implementations, there is provided a method of processing or otherwise operating upon light field image data representing a discretized sampling of a continuous optical wavefront incident from an observable scene. The light field image data can be provided as an array of image data pixels representing a spatial distribution of the optical wavefront after diffraction by a diffraction grating assembly and, optionally, subsequently spectral filtering according to a mosaic color pattern mapped to the array of image data pixels.

Figure 2:
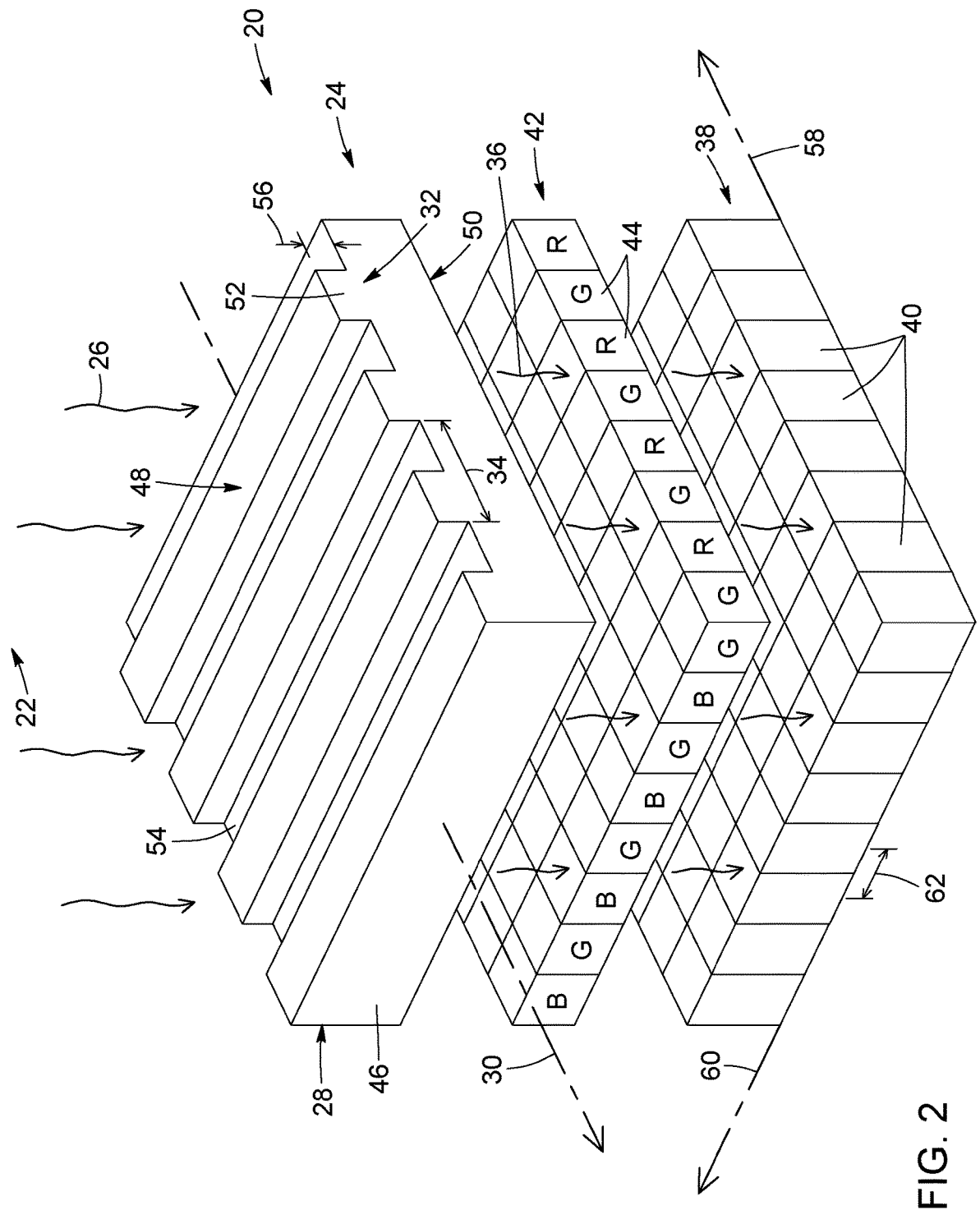
FIG. 2 is a schematic partially exploded perspective view of the light field capture device of FIG. 1.

Referring to FIGS. 1 and 2, there is provided a schematic representation of an example of a light field capture device 20 for capturing raw light field or depth image data about an observable scene 22, which may be used in the context of a method of capturing three-dimensional data of the scene according to some embodiments. In the present description, the term "light field capture device" broadly refers to any image capture device capable of capturing raw image data representing a light field or wavefront emanating from a scene and containing information about not only light intensity at the image plane, but also other light field parameters such as, for example, the direction from which light rays enter the device and the spectrum of the light field.

The light field capture device 20 includes a diffraction grating assembly or structure 24 configured to receive an optical wavefront 26 originating from the scene 22. The diffraction grating assembly 24 can include at least one diffraction grating 28, each of which having a grating axis 30 and a diffraction grating pattern or refractive index modulation pattern 32 having a grating period 34 along the grating axis 30. In FIGS. 1 and 2, the diffraction grating assembly 24 includes a single diffraction grating 28, although more than one diffraction grating can be provided in other devices, as described below. The diffraction grating 28 is configured to diffract the incoming optical wavefront 26, thereby generating a diffracted optical wavefront 36.

Referring still to FIGS. 1 and 2, the light field capture device 20 also includes a pixel array 38 comprising a plurality of light-sensitive pixels 40 disposed under the diffraction grating assembly 24 and configured to detect the diffracted optical wavefront 36 as the light field image data about the scene 22. The light field capture device 20 can also include a color filter array 42 disposed over the pixel array 38. The color filter array 42 includes a plurality of color filters 44 each associated with one of the light-sensitive pixels. The color filters are arranged in a mosaic color pattern and each color filter filters incident light by wavelength to capture color information at a respective location in the color filter array 42. The color filter array 42 is configured to spatially and spectrally filter the diffracted wavefront 36 according to the mosaic color pattern prior to detection of the diffracted wavefront 36 by the plurality of light-sensitive pixels 40. By providing a color filter array to perform a direct spatio-chromatic subsampling of the diffracted wavefront generated by the diffraction grating assembly prior to its detection by the pixel array, the light field capture device can be sensitive to not only its spectral content, but also the angle and intensity of an incident wavefront of light, as explained further below.

Depending on the application or use, the light field capture device can be implemented using various image sensor architectures and pixel array configurations. For example, the light field capture device can be implemented simply by adding or coupling a diffraction grating assembly on top of an already existing image sensor including a pixel array and a color filter array. For example, the existing image sensor can be a conventional 2D CMOS or CCD imager. However, in other implementations, the light field capture device can be implemented and integrally packaged as a separate, dedicated and/or custom-designed device incorporating all or most of its components (e.g., diffraction grating assembly, pixel array, color filter array).

Figure 3:
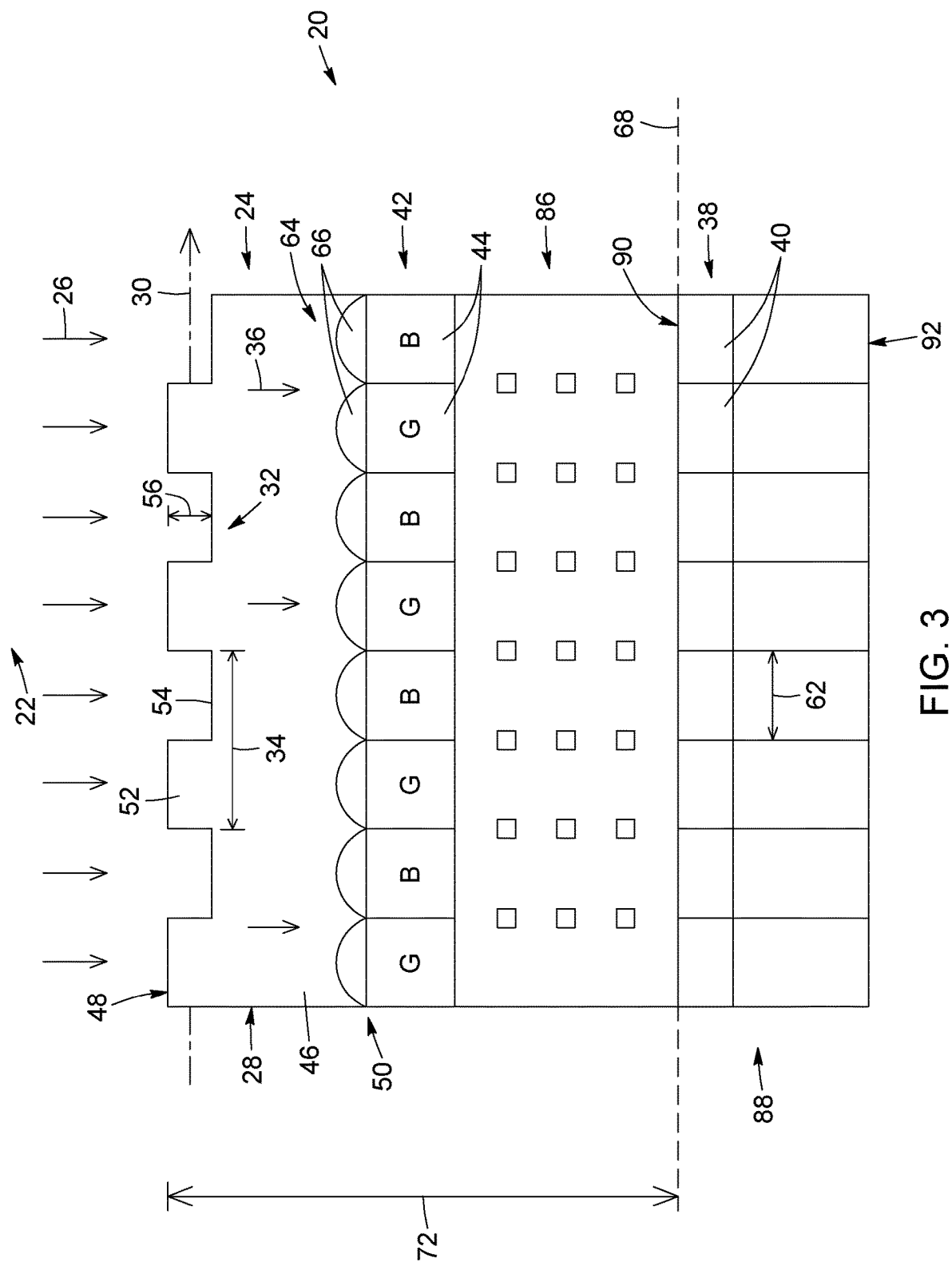
FIG. 3 is a schematic side view of another example of a light field capture device in a frontside illumination configuration, which can be used to obtain light field image data to be processed using the present techniques.
Figure 4:
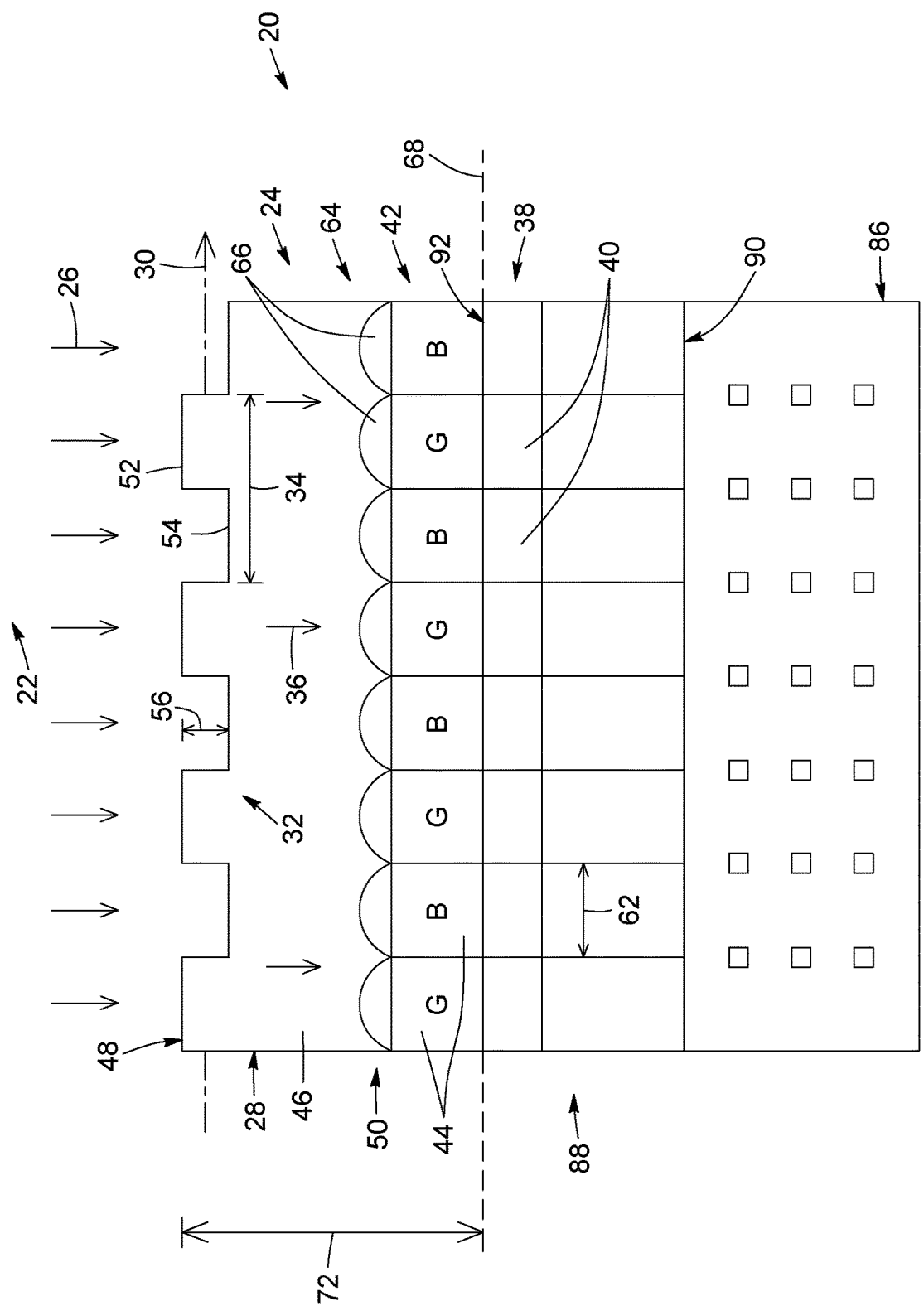
FIG. 4 is a schematic side view of another example of a light field capture device in a backside illumination configuration, which can be used to obtain light field image data to be processed using the present techniques.

For example, referring to FIGS. 3 and 4, in some implementations, the light field capture device 20 can include pixel array circuitry 86 disposed either between the diffraction grating assembly and the pixel array, in a frontside illumination configuration (FIG. 3), or under the pixel array 38, in a backside illumination configuration (FIG. 4). More particularly, the diffraction grating assembly 24 can be directly etched into overlying silicon layers in the case of a frontside illumination architecture (FIG. 3), or placed directly atop a microlens array 64 and a color filter array 42 in the case of a backside illumination architecture (FIG. 4). The microlens array 64 is disposed over the pixel array 38 and includes a plurality of microlenses 66. Each microlens 66 is optically coupled to a corresponding one of the light-sensitive pixels 40 and is configured to focus the spatial part of the diffracted wavefront 36 incident upon it onto its corresponding light-sensitive pixel 40.

In frontside illumination technology, the pixel array circuitry 86 includes an array of metal wiring (e.g., a silicon layer hosting a plurality of metal interconnect layers) connecting the color filters 44 to their corresponding light-sensitive pixels 40. Meanwhile, backside illumination technology provides opportunities for directly sampling the diffracted wavefront 36 produced by diffraction of an optical waveform 26 by the diffraction grating assembly 24. As light does not have to pass through the array of metal wiring of the pixel array circuitry 86 before reaching the pixel array 38, which otherwise would result in a loss of light, more aggressive diffraction grating designs with increased periodicity can be implemented. Also, the shorter optical stack configuration, as shown in FIG. 2, can allow for the diffraction grating assembly 24 to be positioned in much closer proximity to the light-receiving surface 68 of the pixel array 38, thereby decreasing the risk of higher-order diffractive effects which could cause undesirable cross-talk between pixel banks. Similarly, the decreased pixel size can allow for direct subsampling of the diffraction grating by the existing imaging wells.

More detail regarding the structure, configuration and operation of the components introduced in the preceding paragraphs as well as other possible components of the light field capture device will be described below.

Returning to FIGS. 1 and 2, the diffraction grating 28 includes a grating substrate 46 extending over the color filter array 42. The grating substrate 46 has a top surface 48, on which is formed the periodic refractive index modulation pattern 32, and a bottom surface 50. The grating substrate 46 is made of a material that is transparent, or sufficiently transparent, in the spectral operating range to permit the diffracted wavefront 36 to be transmitted therethrough. Non-limiting examples of such material include silicon oxide (SiOx), polymers, colloidal particles, SU-8 photoresist, and glasses. For example, in some implementations the diffraction grating 28 can be configured to diffract the optical wavefront 26 in a waveband ranging from about 400 nm to about 1550 nm.

Diffraction occurs when a wavefront, whether electromagnetic or otherwise, encounters a physical object or a refractive-index perturbation. The wavefront tends to bend around the edges of the object. Should a wavefront encounter multiple objects, whether periodic or otherwise, the corresponding wavelets may interfere some distance away from the initial encounter as demonstrated by Young's double slit experiment. This interference creates a distinct pattern, referred to as a "diffraction grating pattern" or "diffraction pattern" or "interference pattern", as a function of distance from the original encounter, which is sensitive to the incidence angle and the spectral content of the wavefront, and the general size, shape, and relative spatial relationships of the encountered objects. This interference can be described through the evolving relative front of each corresponding wavelet, as described by the Huygens-Fresnel principle.

In the present description, the term "diffraction grating", or simply "grating", generally refers to a periodic structure having periodically modulated optical properties (e.g., a refractive index modulation pattern) that spatially modulates the amplitude and/or the phase of an optical wavefront incident upon it. The diffraction grating may also be referred to as a Transmission Diffraction Mask (TDM). A diffraction grating can include a periodic arrangement of diffracting elements (e.g., alternating ridges and grooves) whose spatial period—the grating period—is nearly equal to or slightly longer than (e.g., up to a few times longer than) the wavelength of light. An optical wavefront containing a range of wavelengths incident on a diffraction grating will, upon diffraction, have its amplitude and/or phase modified, and, as a result, a space- and time-dependent diffracted wavefront is produced. In general, a diffracting grating is spectrally dispersive so that each wavelength of an input optical wavefront will be outputted along a different direction. However, diffraction gratings exhibiting a substantially achromatic response over an operating spectral range exist and can be used in some implementations. For example, in some implementations, the diffraction grating can be achromatic in the spectral range of interest and be designed for the center wavelength of the spectral range of interest. More particularly, in the case of a Bayer patterned color filter array, the diffraction grating can be optimized for the green channel, that is, around a center wavelength of about 532 nm. It is to be noted that when the diffraction grating is achromatic, it is the mosaic color pattern of the color filter array that provides the chromatic sub-sampling of the diffraction pattern of the diffracted wavefront.

Depending on whether the diffracting elements forming the diffraction grating are transmitting or reflective, the diffraction grating will be referred to as a "transmission grating" or a "reflection grating". The diffracting gratings described herein are transmission gratings, although the use of reflection gratings is not excluded a priori. Diffraction gratings can also be classified as "amplitude gratings" or "phase gratings", depending on the nature of diffracting elements. In amplitude gratings, the perturbations to the initial wavefront caused by the grating are the result of a direct amplitude modulation, while in phase gratings, these perturbations are the result of a specific modulation of the relative group-velocity of light caused by a periodic variation of the refractive index of the grating material. The diffracting gratings described herein are phase gratings, although amplitude gratings can also be used in other implementations.

In FIGS. 1 and 2, the diffraction grating 28 is a phase grating, more specifically a binary phase grating for which the refractive index modulation pattern 32 includes a series of ridges 52 periodically spaced-apart at the grating period 34, interleaved with a series of grooves 54 also periodically spaced-apart at the grating period 34. The spatial profile of the refractive index modulation pattern 32 thus exhibits a two-level step function, or square-wave function, for which the grating period 34 corresponds to the sum of the width, along the grating axis 30, of one ridge 52 and one adjacent groove 54. The grating period 34 can range from about 1 μm to about 20 μm, although other values are possible. In FIGS. 1 and 2, the grooves 54 are empty (i.e., they are filled with air), but they could alternatively be filled with a material having a refractive index different from that of the ridge material. Also, depending on the application, the diffraction grating 28 can have a duty cycle substantially equal to or different from 50%, the duty cycle being defined as the ratio of the ridge width to the grating period 34. Another parameter of the diffraction grating 28 is the step height 56, that is, the difference in level between the ridges 52 and the grooves 54. For example, the step height 56 can range from about 0.2 μm to about 1 μm. In some scenarios, the step height 56 can be selected so that the diffraction grating 28 causes a predetermined optical path difference between adjacent ridges 52 and grooves 54. For example, the step height 56 can be controlled to provide, at a given wavelength and angle of incidence of the optical wavefront (e.g. its center wavelength), a half-wave optical path difference between the ridges and the grooves. Of course, other optical path difference values can be used in other applications.

It is to be noted that while the diffraction grating 28 in FIGS. 1 and 2 is a linear, or one-dimensional, binary phase grating consisting of alternating sets of parallel ridges 52 and grooves 54 forming a square-wave refractive index modulation pattern 32, other light field capture device can employ different types of diffraction gratings, such as: diffraction gratings where at least one among the grating period, the duty cycle and the step height is variable; diffraction gratings with non-straight features perpendicular to the grating axis; diffraction gratings having more elaborate refractive index profiles; 2D diffraction gratings; and the like.

Referring still to FIGS. 1 and 2, the pixel array 38 includes a plurality of light-sensitive pixels 40 disposed under the color filter array 42, which is itself disposed under the diffraction grating assembly 24. In the present techniques, the electromagnetic radiation that is detected by the light-sensitive pixels 40 as light field image data corresponds to an optical wavefront 26 incident from the scene 22, which has been diffracted and spatio-chromatically filtered prior to reaching the pixel array 38. The pixel array 38 can be embodied by a CMOS or a CCD image sensor, but other types of photodetector arrays could alternatively be used. As mentioned above, the pixel array 38 can be configured to detect electromagnetic radiation in any appropriate region of the spectrum. Each light-sensitive pixel 40 of the pixel array 38 can convert the spatial part of the diffracted wavefront 36 incident upon it into accumulated charge, the amount of which is proportional to the amount of light collected and registered by the pixel 40. Each light-sensitive pixel 40 can include a light-sensitive surface and associated pixel circuitry for processing signals at the pixel level and communicating with other electronics, such as a readout unit.

Referring still to FIGS. 1 and 2, the light-sensitive pixels 40 can be arranged into a rectangular grid of rows and columns defined by two orthogonal pixel axes 58, 60. The number of rows and columns defines the resolution of the pixel array 38. For example, in some implementations, the pixel array 38 can have a resolution of at least 16 pixels, although a wide range of other resolution values, including up to 40 megapixels or more, can be used in other applications. It is to be noted that while the light-sensitive pixels 40 are organized into a 2D array in FIGS. 1 and 2, they may alternatively be configured as a linear array in other applications.

The pixel array 38 can also be characterized by a pixel pitch 62. In the present description, the term "pixel pitch" generally refers to the spacing between the individual pixels 40 and is typically defined as the center-to-center distance between adjacent pixels 40. Depending on the physical arrangement of the pixel array 38, the pixel pitch 62 along the two orthogonal pixel axes 58, 60 may or may not be the same. It is to be noted that a pixel pitch can also be defined along an arbitrary axis, for example along a diagonal axis oriented at 45° with respect to the two orthogonal pixel axes 58, 60. It is also to be noted that, in the present techniques, a relevant pixel pitch 62 is the one along the grating axis 30 of the overlying diffraction grating 28, as depicted in FIGS. 1 and 2. As described in greater detail below, in some embodiments the grating period 34 of the diffraction grating 28 is selected to be larger than the pixel pitch 62 of the pixel array 38 along the grating axis 30, or, said differently, the pixel pitch 62 along the grating axis 30 is smaller than the grating period 34. For example, in some implementations the pixel pitch 62 along the grating axis 30 can range from 1 μm or less to 10 μm, although different pixel pitch values can be used in other implementations.

In the present description, the term "pixel data" refers to the image information captured by each individual pixel and can include intensity data indicative of the total amount of optical energy absorbed by each individual pixel over an integration period. Combining the pixel data from all the pixels 40 yields "raw" light field image data about the scene 22. In the present techniques, because the optical wavefront 26 incident from the scene 22 is diffracted and spatially and spectrally filtered prior to detection, the light field image data provides information about not only the intensity of the incident wavefront 26, but also other light field parameters such as its angle of incidence, phase and spectral content. More particularly, it will be understood that the present techniques can allow recovery or extraction of depth or other light field information from the intensity-based diffraction pattern captured by the pixel array 38, as described further below.

Referring still to FIGS. 1 and 2, the color filter array 42 is spatially registered with the pixel array 38, such that each color filter 44 is optically coupled to a corresponding one of the light-sensitive pixels 40. That is, each color filter 44 covers a single light-sensitive pixel 40, such that there is a one-to-one relationship, or mapping, between the color filters 44 and the light-sensitive pixels 40. However, in other implementations, each color filter can be optically coupled to at least two corresponding ones of the plurality of light-sensitive pixels. In both configurations, however, the color filter array 42 and the pixel array 38 together enable the direct spatio-chromatic sampling of the diffracted wavefront produced by the overlying diffraction grating assembly 24, as detailed and explained below.

In FIGS. 1 and 2, the color filters 44 are physically organized according to a mosaic color pattern or configuration. The color filters form a color mosaic defining a primary color and one or more secondary colors arranged such that different neighboring pixels associated with the primary color detect different spatial parts of the diffracted optical wavefront over a full cycle of the diffracted optical wavefront. In some implementations, each color filter 44 is one of a red pass filter, a green pass filter and a blue pass filter. For example, in FIGS. 1 and 2, the mosaic color pattern of the color filter array 42 is a Bayer pattern, in which the color filters arranged in a checkerboard pattern with rows of alternating red (R) and green (G) filters are interleaved with rows of alternating green (G) and blue (B) filters. A Bayer pattern contains twice as many green filters as red or blue filters, such that the green component of the mosaic color pattern can be referred to as the primary of main color or as a "densely sampled" component. and both the red and blue components can be referred to as secondary colors or "sparsely sampled" components. In other applications, the mosaic color pattern can be embodied by more elaborate Bayer-type patterns, for example Bayer-type patterns with an n-pixel unit cell, where n is an integer greater than 4. Of course, the present techniques are not limited to Bayer-type patterns, but can be applied to any appropriate mosaic color pattern including, but not limited to, RGB, RGB-IR, RGB-W, CYGM, CYYM, RGBE, RGBW #1, RGBW #2, RGBW #3, and monochrome. It is to be noted that in some implementations, the color filter array 42 may be extended beyond the standard visible Bayer pattern to include hyperspectral imaging and filtering techniques or interferometric filtering techniques. In such cases, the design of the diffraction grating 28 (e.g., the grating period 34) can be adjusted to accommodate the increased spectral sampling range.

Figure 5:
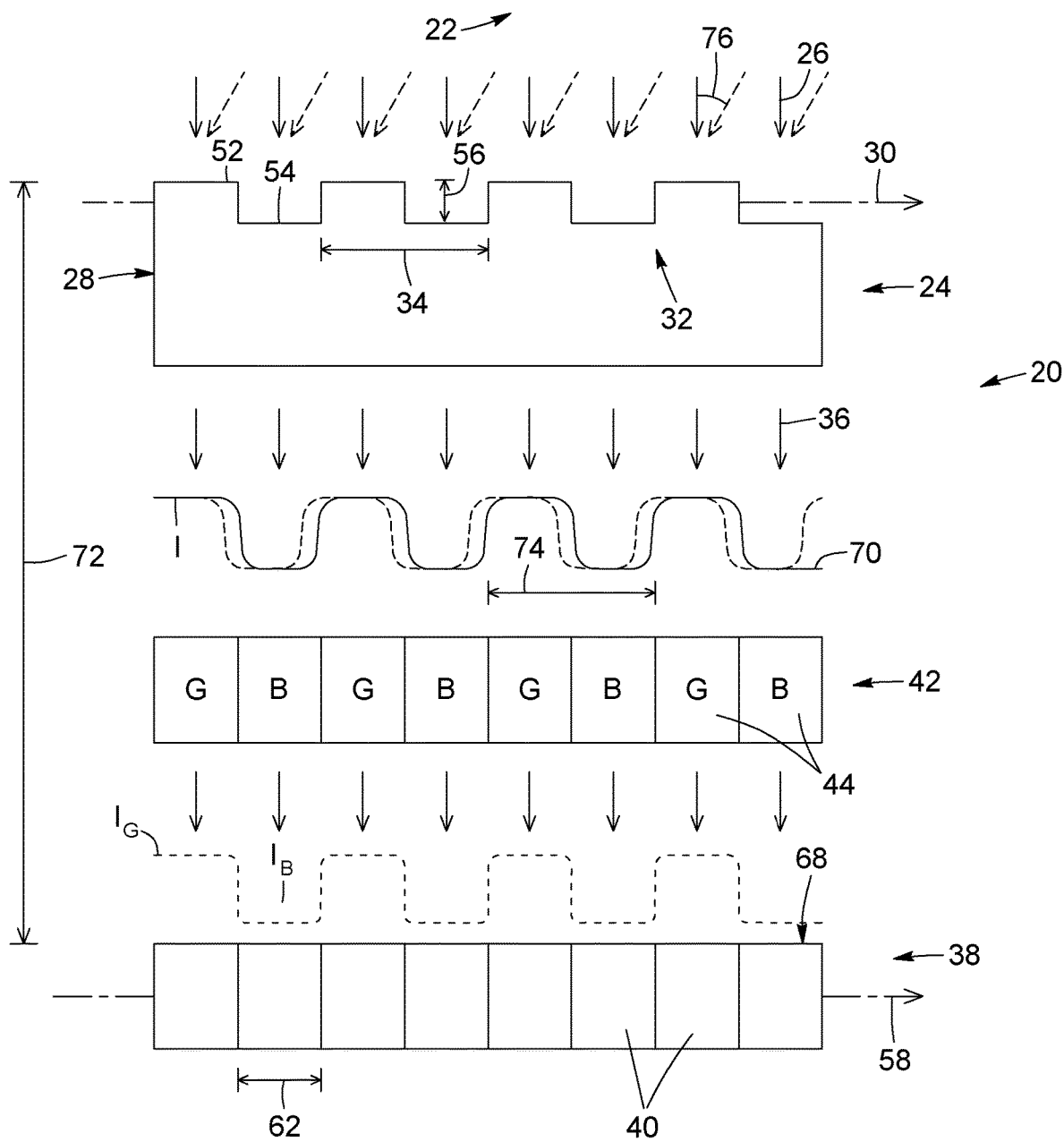
FIG. 5 is a schematic partially exploded side view of another example of a light field capture device that can be used to obtain light field image data to be processed using the present techniques, where the propagation of a wavefront of light through the device is schematically depicted.

Referring now to FIG. 5, there is shown a schematic partially exploded side view of a light field capture device 20 suitable for monochrome imaging applications. The light field capture device 20 shares similarities with the one shown in FIGS. 1 and 2, in that it includes a diffraction grating 28 disposed on top of a pixel array 38 of light-sensitive pixels 40 and associated color filter array 42. The diffraction grating 28 is a binary phase transmission grating having a duty cycle of 50% and a periodic refractive index modulation pattern 32 consisting of alternating sets of ridges 52 and grooves 54. FIG. 5 also depicts schematically the propagation of light through the device 20. In operation, the light field capture device 20 has a field of view encompassing an observable scene 22. The diffraction grating 28 receives an optical wavefront 26 (solid line) incident from the scene 22 on its input side, and diffracts the optical wavefront 26 to generate, on its output side, a diffracted optical wavefront 36 (solid line) that propagates through the color filter array 42 toward the pixel array 38 for detection thereby. For simplicity, the incoming optical wavefront 26 in FIG. 5 corresponds to the wavefront of a plane wave impinging on the diffraction grating 28 at normal incidence. However, the present techniques can be implemented for an optical wavefront of arbitrary shape incident on the diffraction grating 28 at an arbitrary angle within the field of view of the light field capture device.

Referring still to FIG. 5, the diffracted wavefront 36 can be characterized by a diffraction pattern whose form is a function of the geometry of the diffraction grating 28, the wavelength and angle of incidence of the optical wavefront 26, and the position of the observation plane, which corresponds to the light-receiving surface 68 of the pixel array 38. In the observation plane, the diffraction pattern of the diffracted wavefront 36 can be characterized by a spatially varying intensity profile 70 along the grating axis 30 in the light-receiving surface 68 of the pixel array 38. It is to be noted that in FIG. 5, the grating axis 30 is parallel to the pixel axis 58.

The diffraction grating 28 and the pixel array 38 are disposed relative to each other such that the light-receiving surface 68 of the pixel array 38 is positioned in the near-field diffraction region, or simply the near field, of the diffraction grating 28, as described in co-assigned international PCT patent application No. PCT/CA2017/050686. In the near-field diffraction regime, the Fresnel diffraction theory can be used to calculate the diffraction pattern of waves passing through a diffraction grating. Unlike the far-field Fraunhofer diffraction theory, Fresnel diffraction accounts for the wavefront curvature, which allows calculation of the relative phase of interfering waves. To detect the diffracted wavefront 36 in the near field, the present techniques can involve maintaining a sufficiently small separation distance 72 between the top surface 48 of the diffraction grating 28, where refractive index modulation pattern 32 is formed and diffraction occurs, and the light-receiving surface 68 of the underlying pixel array 38, where the diffracted wavefront 36 is detected. In some implementations, this can involve selecting the separation distance 72 to be less than about ten times a center wavelength of the optical wavefront 26.

In the near-field diffraction regime, the intensity profile 70 of the diffracted wavefront 36 produced by a periodic diffraction grating 28 generally has a spatial period 74 that substantially matches the grating period 34 of the diffraction grating 28 as well as a shape that substantially matches the refractive index modulation pattern 32 of the diffraction grating 28. For example, in FIG. 5, the diffraction pattern of the diffracted wavefront 36 detected by the light-sensitive pixels 40 of the pixel array 38 has a square-wave, or two-step, intensity profile 70 that substantially matches that of the refractive index modulation pattern 32 of the binary phase diffraction grating 28. In the present description, the term "match" and derivatives thereof should be understood to encompass not only an "exact" or "perfect" match between the intensity profile 70 of the detected diffracted wavefront 36 and the periodic refractive index modulation pattern 32 of the diffraction grating 28, but also a "substantial", "approximate" or "subjective" match. The term "match" is therefore intended to refer herein to a condition in which two features are either the same or within some predetermined tolerance of each other. Another feature of near-field diffraction by a periodic diffraction grating is that upon varying the angle of incidence 76 of the incoming optical wavefront 26 on the diffraction grating 28, the intensity profile 70 of the diffracted wavefront 36 is laterally shifted along the grating axis 30, but substantially retains its period 74 and shape, as can be seen from the comparison between solid and dashed wavefront lines in FIG. 5.

In the embodiment illustrated in FIG. 5, the color filter array 42 has a Bayer pattern, of which FIG. 5 depicts a row of alternating green (G) and blue (B) filters. FIG. 5 also depicts schematically the propagation of light through the device 20. In operation, the diffraction grating 28 receives and diffracts an optical wavefront 26 originating from the scene 22 to generate a diffracted optical wavefront 36, as mentioned above. The color filter array 42 receives and spatio-spectrally filters the diffracted optical wavefront 36 prior to its detection by the underlying pixel array 38. The operation of the light field capture device 20 is therefore based on a directly spatio-and-chromatically sampled diffracted wavefront 36 enabled by the provision of a periodic diffraction grating 28 deposed on top of a sensor structure including a color filter array 42 and an underlying pixel array 38.

Upon being optically coupled to an underlying pixel array 38, the diffraction grating 28 convolves light phase information with a standard 2D image, so that the intensity profile 70 of the diffraction pattern of the detected diffracted wavefront 36 can generally be written as a modulated function $I \sim I_{mod}$(depth info)$\times I_{base}$ (2D image) including a modulating component $I_{mod}$ and a base component $I_{base}$. The base component $I_{base}$ represents the non-phase-dependent optical wavefront that would be detected by the pixel array 38 if there were no diffraction grating 28 in front of it. In other words, detecting the base component $I_{base}$ alone would allow a conventional 2D image of the scene 22 to be obtained. Meanwhile, the modulating component $I_{mod}$, which is generally small compared to the base component $I_{base}$ (e.g., ratio of $I_{mod}$ to $I_{base}$ ranging from about 0.1 to about 0.3), is a direct result of the phase of the incident optical wavefront 26, so that any edge or slight difference in incidence angle will manifest itself as a periodic electrical response spatially sampled across the pixel array 38. The sensitivity to incidence angle, and therefore the angular resolution, depends on the specific design of the diffraction grating 28.

It will be understood that the intensity profile 70 of the diffracted wavefront 36 that is detected by the pixel array 38 after spatio-spectral filtering by the color filter array 42 is a combination or superposition of the portions of the diffracted wavefront 36 filtered by the red filters, the portions of the diffracted wavefront 36 filtered by the green filters, and the portions of the diffracted wavefront 36 filtered by the blue filters. As such, using a standard RGB Bayer pattern as an example, the modulating component $I_{mod}$ and the base component $I_{base}$ of the intensity profile I can be split into their respective color components as follows:

$$I_R \sim I_{mod,R}(\text{depth info}) \times I_{base,R}(2D \text{ image}), \quad (3)$$

$$I_G \sim I_{mod,G}(\text{depth info}) \times I_{base,G}(2D \text{ image}), \quad (4)$$

$$I_B \sim I_{mod,B}(\text{depth info}) \times I_{base,B}(2D \text{ image}). \quad (5)$$

In FIG. 5, the intensity profiles $I_G$ and $I_B$ are depicted in dashed and dotted lines, respectively. In some implementations, these individual color channels may be treated independently to create individual color channel light field scenes. These individual scenes may be compared to provide both another cue for depth and scene analysis as well as image compression, since the image may be transferred in individual color channels each with its own respective file.

Referring still to FIG. 5, as mentioned above, in some embodiments the pixel array 38 has a pixel pitch 62 along the grating axis 30 that is smaller than the grating period 34 of the diffraction grating 28. This means that when the light-receiving surface 68 of the pixel array 38 is in the near field of the diffracting grating 28, the pixel pitch 62 of the pixel array 38 along the grating axis 30 is also smaller than the spatial period 74 of the intensity profile 70 along the grating axis 30 of the detected diffracted wavefront 36. When this condition is fulfilled, a complete period of the intensity profile 70 of the detected diffracted wavefront 36 will be sampled by at least two adjacent pixel banks of the pixel array 38, each of these pixel banks sampling a different spatial part of the intensity profile 70 over a full cycle. In the present description, the term "pixel bank" refers to a group of light-sensitive pixels of the pixel array that are arranged along a line which is perpendicular to the grating axis of the overlying diffraction grating. That is, two adjacent pixel banks are separated from each other by a distance corresponding to the pixel pitch along the grating axis. For example, in FIG. 5, each pixel bank of the pixel array 38 extends perpendicularly to the plane of the page.

Depending on the application, the ratio R of the grating period 34 of the diffraction grating 28 to the pixel pitch 62 of the pixel array 38 along the grating axis 30 can take several values. In some implementations, the ratio R can be equal to or greater than two (i.e., R≥2); or equal to a positive integer greater than one (i.e., R=(n+1), where n={1, 2, . . . }); or equal to an integer power of two (i.e., R=2n, where n={1, 2, . . . }); or the like. In some implementations, it may be beneficial or required that the grating period 34 be not only larger than, but also not too close to the pixel pitch 62 along the grating axis 30. For example, in some implementations, it may be advantageous that the grating period 34 be at least about twice the underlying pixel bank pitch 62 to allow for each pair of adjacent pixel banks to sufficiently subsample the resultant modulated diffracted wavefront 36, whose spatial modulation rate is dictated by the properties of the diffraction grating 28, near or at Nyquist rate. This Nyquist, or nearly Nyquist, subsampling can allow for the direct removal of the modulating component $I_{mod}$ from the measured signal I by standard signal processing techniques. Once removed, the modulating signal $I_{mod}$ may be manipulated independently of the base component $I_{base}$.

For example, in FIG. 5, the ratio R of the grating period 34 to the pixel pitch 62 along the grating axis 30 is substantially equal to two. It will be understood that in such a case, adjacent pixel banks will sample complimentary spatial phases of the intensity profile 70 of the detected diffracted wavefront 36, that is, spatial parts of the intensity profile 70 that are phase-shifted by 180° relative to each other. This can be expressed mathematically as follows: $|\phi_{bank,n+1}-\phi_{bank,n}|=\pi$, where $\phi_{bank,n+1}$ and $\phi_{bank,n}$ are the spatial phases of the intensity profile 70 measured by the $(n+1)^{th}$ and the $n^{th}$ pixel banks of the pixel array 38, respectively. Such a configuration can allow for a direct deconvolution of the modulating component $I_{mod}$ and the base component $I_{base}$ through the subsampling of the interference pattern resulting from the incident wave fronts interaction:

$$I_{base}=\frac{1}{2}[I(\text{bank}_n)+I(\text{bank}_{n+1})], \quad (6)$$

$$I_{mod}=\frac{1}{2}[I(\text{bank}_n)-I(\text{bank}_{n+1})]. \quad (7)$$

It is to be noted that $I(\text{bank}_n)\pm I(\text{bank}_{n+1})$ in Equations (6) and (7) are generally obtained by summing the intensities measured by the pixels of all the rows in the associated pixel bank.

Referring still to FIG. 5, the diffraction grating 28 has a duty cycle of 50% (i.e., ridges 52 and grooves 54 of equal width), and each light-sensitive pixel 40 is positioned under and in vertical alignment with either a corresponding one of the ridges 52 or a corresponding one of the grooves 54. However, other arrangements can be used in other applications.

In a standard RGB Bayer pattern, because the red and blue filters are always located in adjacent pixel banks, the signals $I_R$ and $I_B$, which are associated with the sparsely sampled red and blue components, will be in antiphase relative to each other. Meanwhile, because green filters are present in all pixel banks, the signal $I_G$, which is associated with the densely sampled green components, will contain both in-phase and out-of-phase contributions.

Figure 6A:
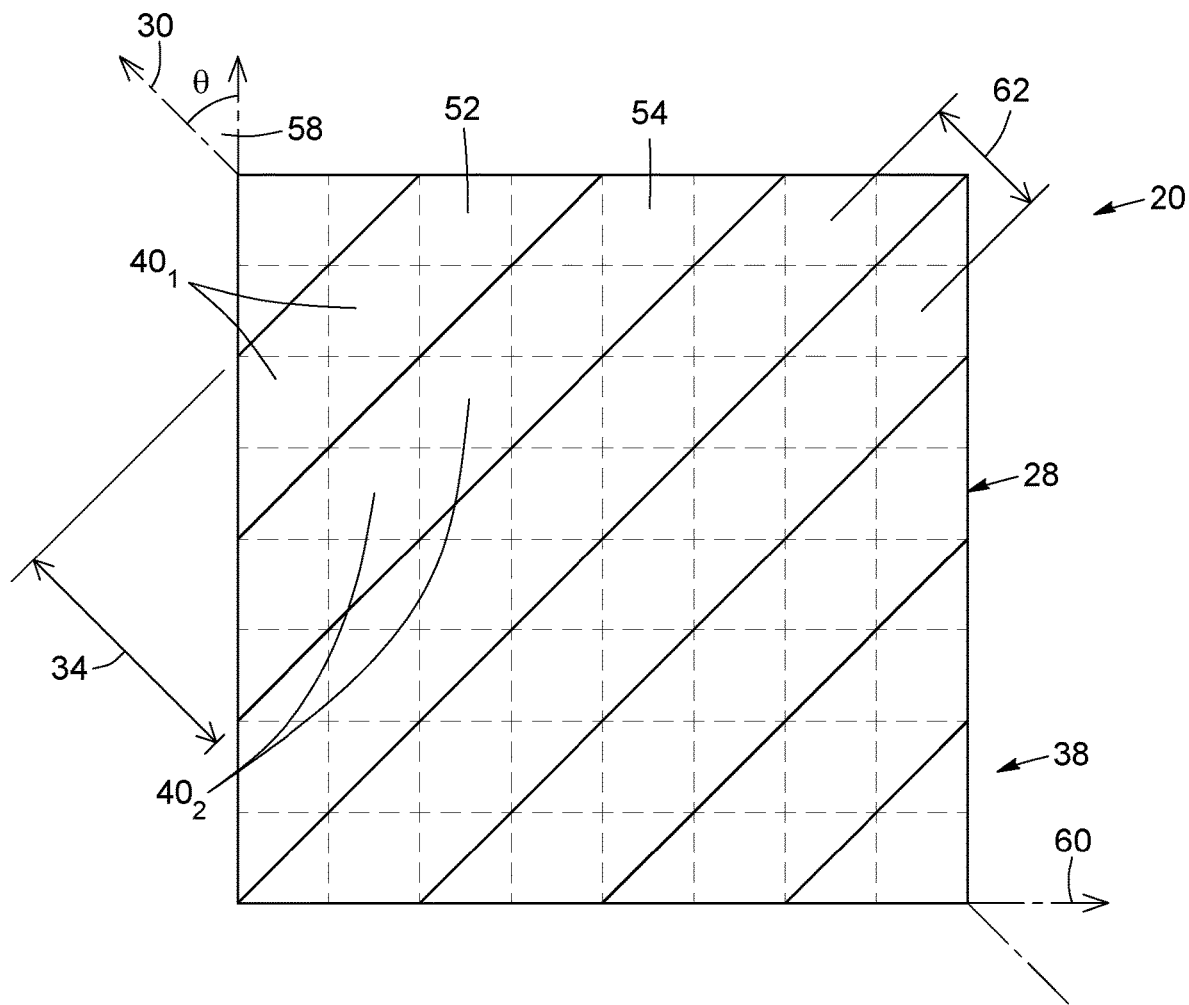
FIGS. 6A and 6B are schematic partially transparent top views of two other examples of a light field capture device that can be used to obtain light field image data to be processed using the present techniques, where the grating axis of the diffraction grating is not aligned with either of the pixel axes.
Figure 6B:
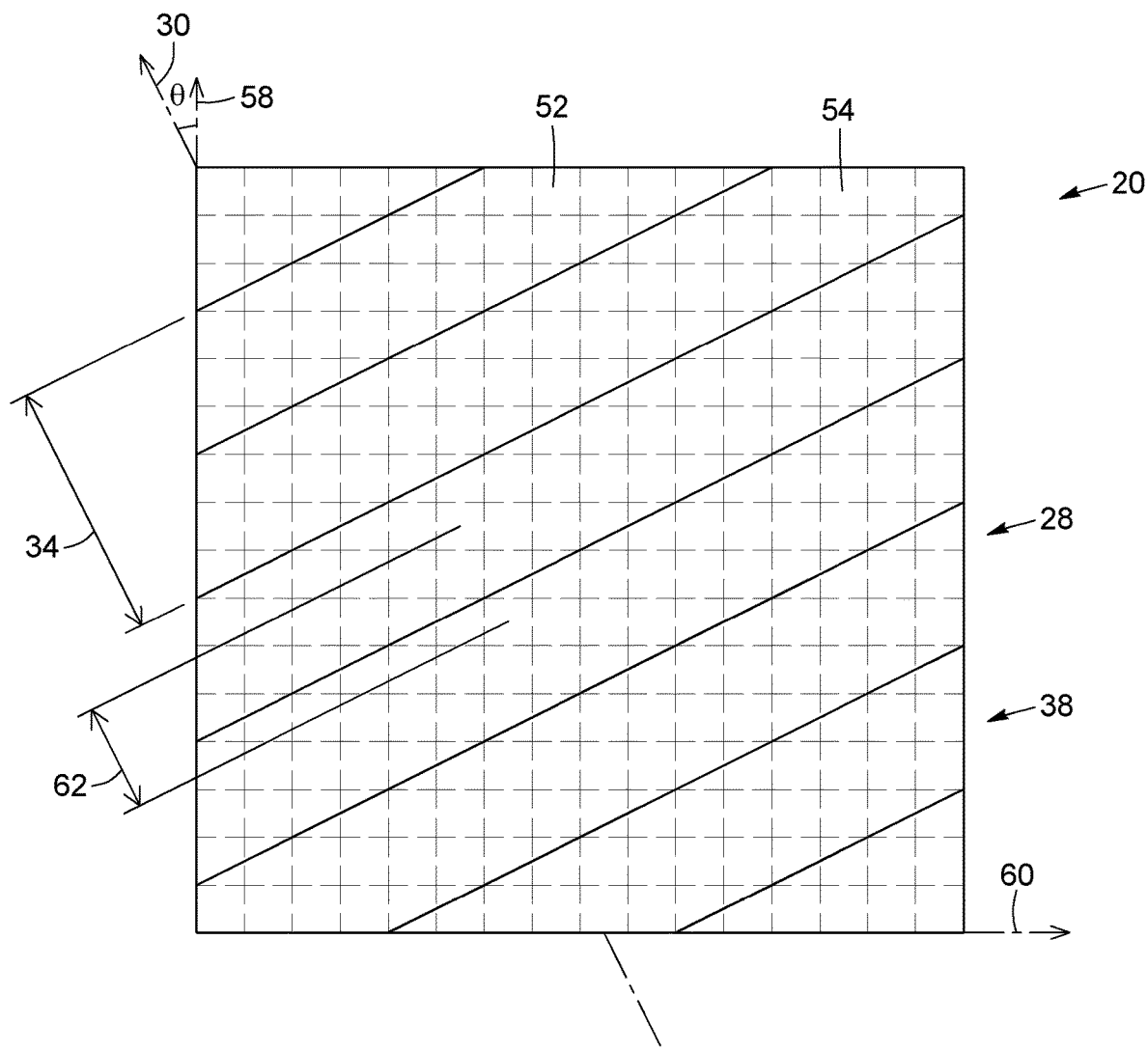

In FIG. 5, the diffraction grating 28 is oriented with respect to the underlying pixel array 38 so that the grating axis 30 is parallel to one of the two orthogonal pixel axes 58, 60. Referring to FIGS. 6A and 6B, in other applications the grating axis 30 can instead be oblique to the orthogonal pixel axes 58, 60. It is to be noted that in such configurations, the pixel pitch 62 along the grating axis 30 may remain smaller than the grating period. It is also to be noted that pixel banks such as defined above, that is, groups of pixels arranged along a line transverse to the grating axis 30 of the overlying diffraction grating 28 can also be defined in oblique configurations. For example, FIG. 6A includes a first group of pixels $40_1$ that belong to a first pixel bank located under ridge 52, and a second group of pixels $40_2$ that belongs to a second pixel bank located at an adjacent groove 54.

Figure 7:
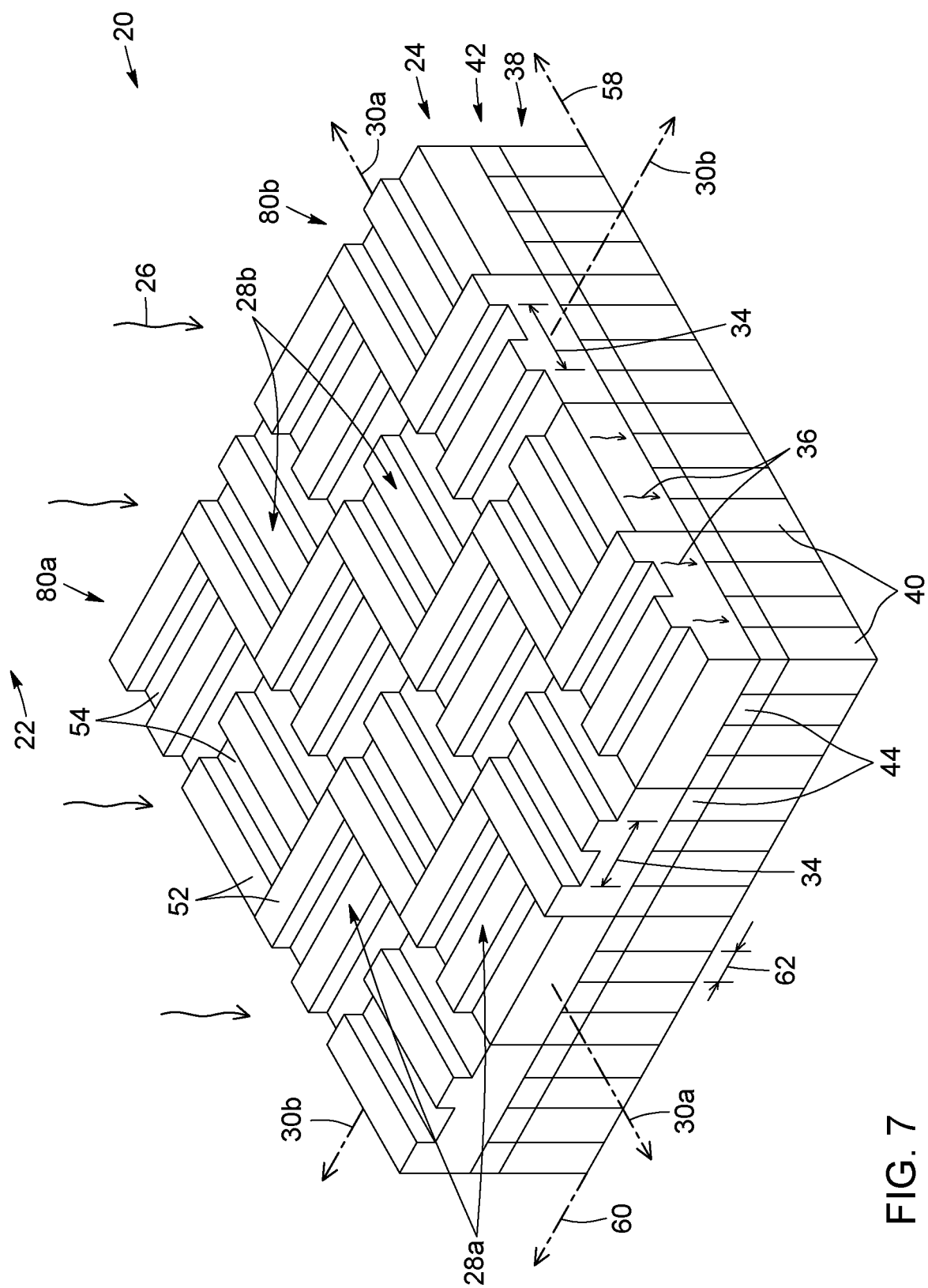
FIG. 7 is a schematic perspective view of another example of a light field capture device that can be used to obtain light field image data to be processed using the present techniques, where the diffracting grating assembly includes two sets of orthogonally oriented diffracting gratings arranged to alternate in both rows and columns to define a checkerboard pattern.

In the examples described so far, the diffraction grating assembly included a single diffracting grating. However, referring to FIG. 7, in other cases, the diffraction grating assembly 24 includes a plurality of diffracting gratings 28a, 28b, where the diffracting gratings 28a, 28b are arranged in a two-dimensional grating array disposed over the color filter array 42. In FIG. 7, the diffracting grating assembly 24 includes sixteen diffraction gratings, but this number can be varied in other applications. For example, depending on the application, the number of diffraction gratings 28a, 28b in the diffraction grating assembly 24 can range from one to up to millions (e.g., a 20-megapixel pixel array 38 could have up to 2.8 million diffraction gratings on top of it). It is to be noted that other than their grating axis orientation, the diffraction gratings 28 in FIG. 7 are identical, although this is not a requirement of the present techniques.

In FIG. 7, the diffraction gratings 28 include a first set 80a of diffraction gratings 28 and a second set 80b of diffraction gratings 28, the grating axes 30a of the diffraction gratings 28 of the first set 80a extending substantially perpendicularly to the grating axes 30b of the diffraction gratings 28 of the second set 80b. In FIG. 7, the diffraction gratings 28 of the first set 80a and second set 80b are arranged to alternate in both rows and columns, resulting in a checkerboard pattern. Of course, any other suitable regular or irregular arrangement, pattern or mosaic of orthogonally oriented gratings can be envisioned in other applications.

In some applications, the light field capture device can include wavefront conditioning optics in front of the diffraction grating. The wavefront conditioning optics can be configured to collect, direct, transmit, reflect, refract, disperse, diffract, collimate, focus or otherwise act on the optical wavefront incident from the scene prior to it reaching the diffraction grating assembly. The wavefront conditioning optics can include lenses, mirrors, filters, optical fibers, and any other suitable reflective, refractive and/or diffractive optical components, and the like. In some implementations, the wavefront conditioning optics can include focusing optics positioned and configured to modify the incident wavefront in such a manner that it may be sampled by the light field capture device.

Figure 8:
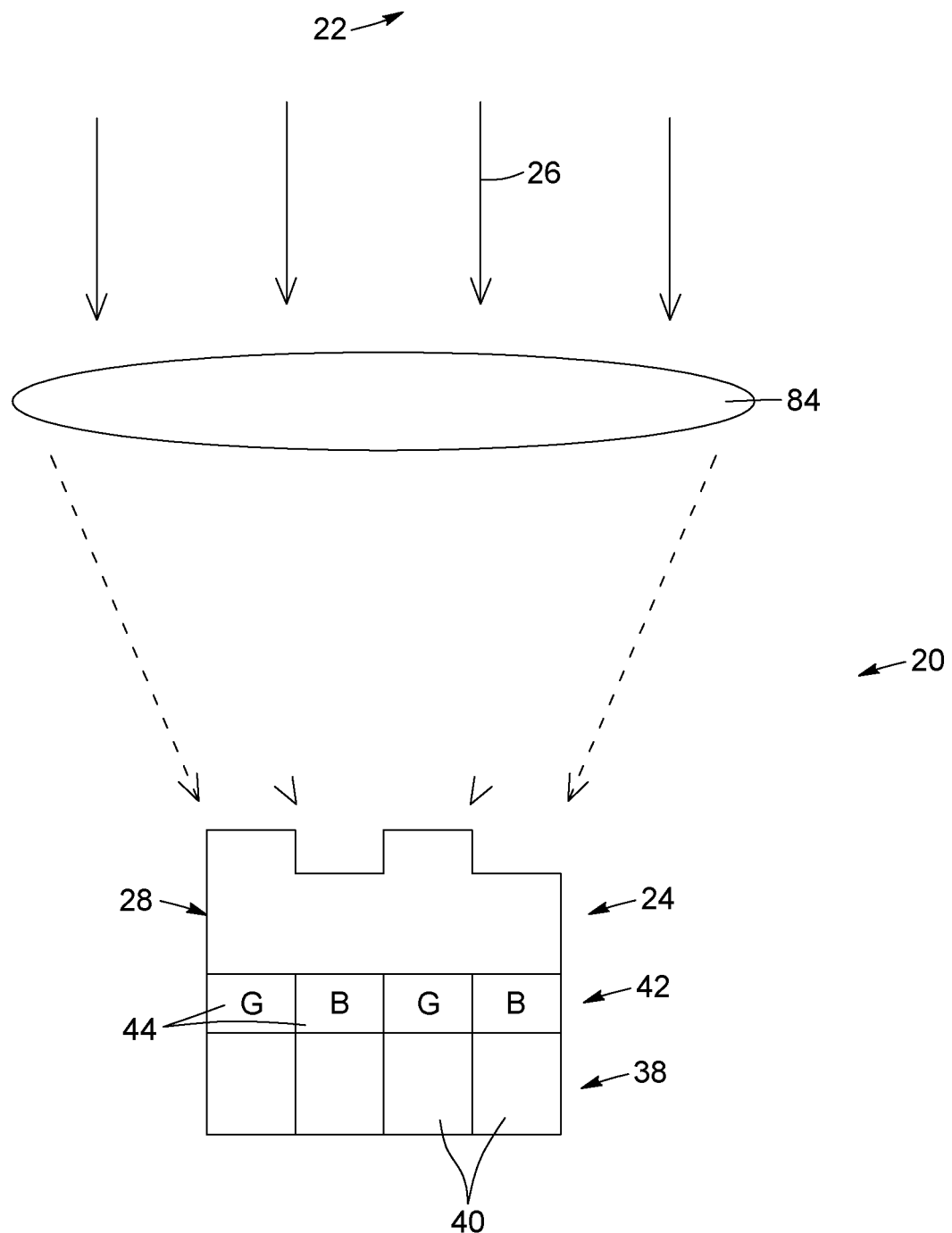
FIG. 8 is a schematic side view of another example of a light field capture device that can be used to obtain light field image data to be processed using the present techniques. The light field capture device includes focusing optics disposed in front of the diffraction grating assembly and spatio-spectrally spreading the optical wavefront originating from the scene prior to it reaching the diffraction grating assembly.

Referring now to FIG. 8, another possible example of a light field capture device 20 is illustrated and includes dispersive optics 84 disposed in a light path of the optical wavefront 26 between the scene and the diffraction grating assembly 24. The dispersive optics 84 is configured to receive and disperse the incoming optical wavefront 26. The dispersive optics 84 can be embodied by any optical component or combination of optical components in which electromagnetic beams are subject to spatial spreading as a function of wavelength as they pass therethrough (e.g., by chromatic aberration). In FIG. 8, the dispersive optics 84 is a focusing lens, for simplicity. However, it will be understood that, in other embodiments, the dispersive optics 84 can be provided as an optical stack including a larger number of optical components (e.g., focusing and defocusing optics) that together act to disperse the optical wavefront 26 before it impinges on the diffraction grating assembly 24 (e.g., due to their intrinsic chromatic aberration).

For exemplary purposes, it is assumed in FIG. 8 that the optical wavefront 26 originating from the scene 22 is a superposition of waves containing multiple wavelengths of light, for example a green component (dashed line) and a blue component (dotted line). Each color component of the optical wavefront 26, by the nature of its energy-dependent interaction with the dispersive optics 84, will follow a slightly different optical path, leading to a chromatic dependence in the phase-shift introduced by the diffraction grating 28. In other words, the chromatic spread of the optical wavefront 26, as sampled through the angle-dependent diffraction produced by the diffractive grating 28, can be taken advantage of to provide coarse depth information about the optical wavefront 26. In such scenarios, as described below, the finer details of the depth information can be obtained from a comparative analysis of the modulating components $I_{mod,R}$ and $I_{mod,B}$, which are phase-shifted relative to each other due to their optical path differences, as sampled by the color filter array 42. That is, because red and blue lights are focused differently by the dispersive optics 84 because of chromatic aberration, this difference can provide finer detail for depth acquisition.

Figure 9:
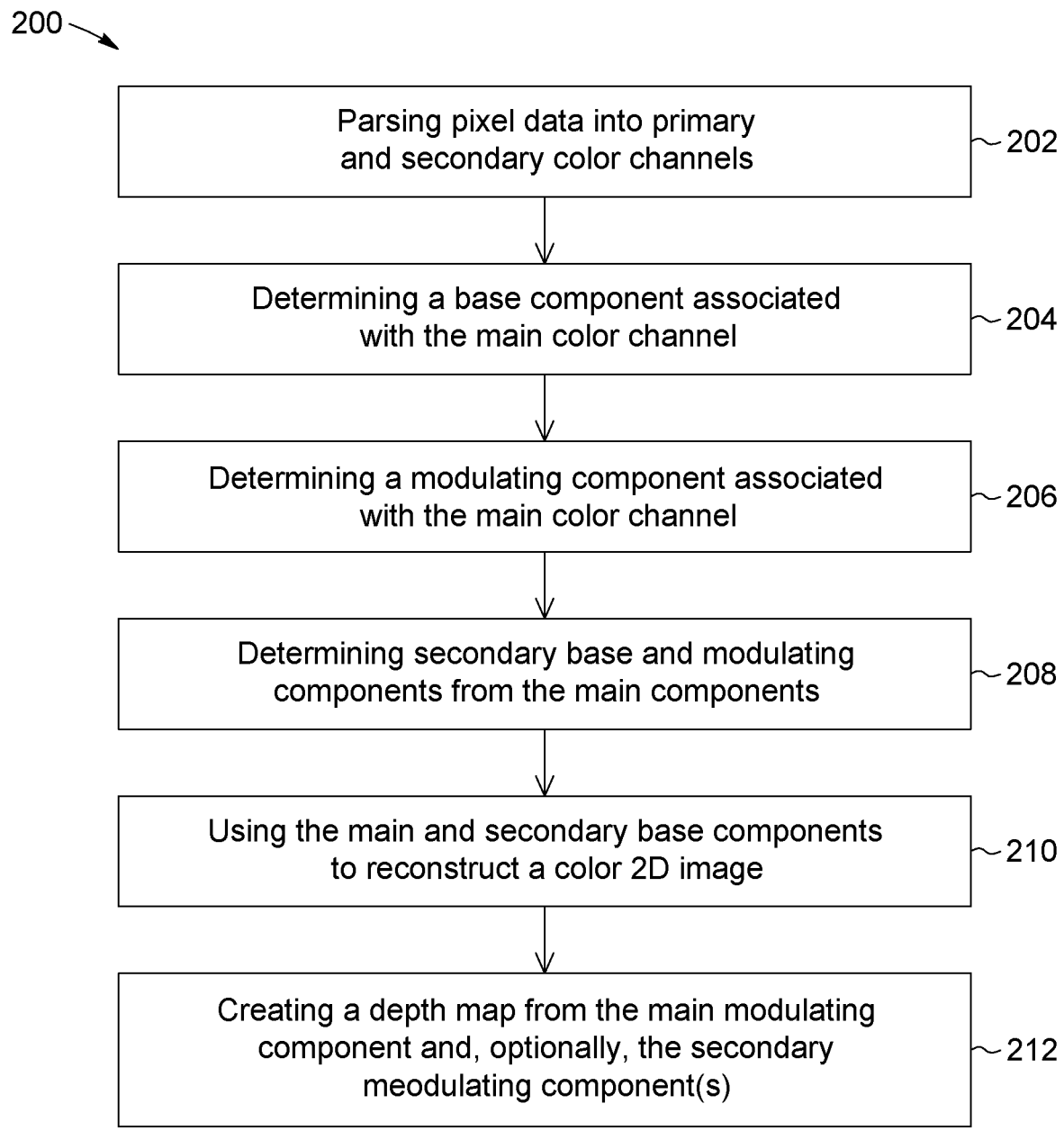
FIG. 9 is a flow diagram of an image processing method, in accordance with a possible embodiment.

Referring to FIG. 9, there is shown a flow diagram of an embodiment of a method 200 for processing light field image data corresponding to a light field from a scene. The light field image data could be obtained with a light field capture device 20 such as those described above (e.g., the one in FIG. 8), or with another light field capture device, for example through a rolling or global shutter-like process.

Figure 10:
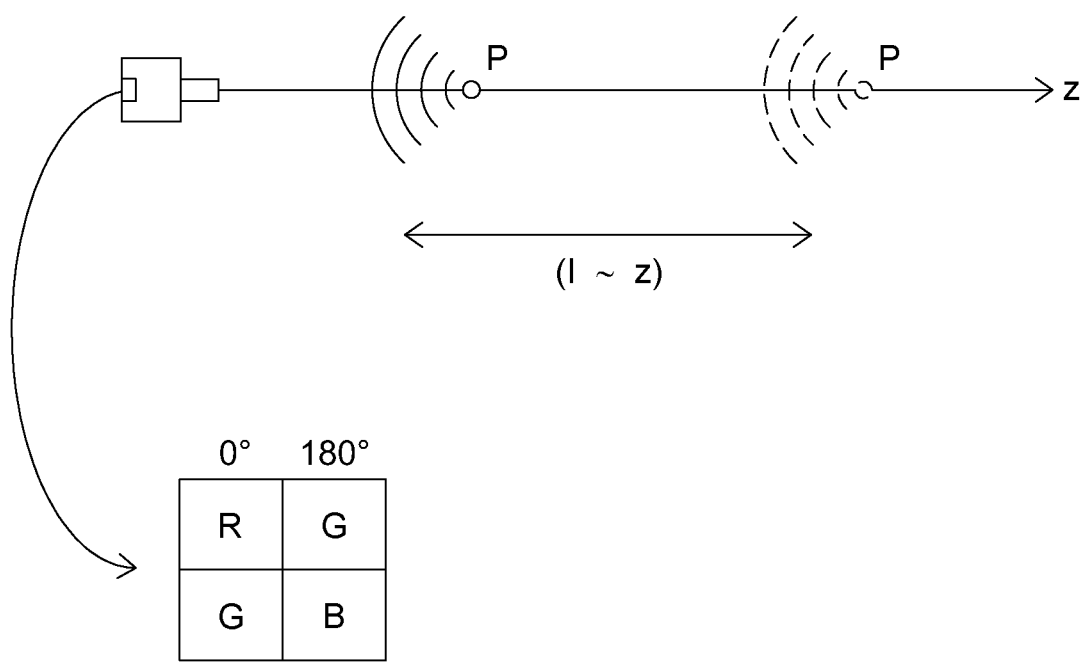
FIG. 10 is a diagram illustrating the acquisition of data to build the color radial transfer functions according to one variant.

The image data captured by the light field capture device 20 of FIG. 10 represents a discretized sampling of a continuous light field or wavefront 26 incident from an observable scene 22. This discretization can occur through various optical processes and interactions: the field-of-view limitations due to the finite aperture size of the device 20, the limitations imposed by lenses in terms of what information can be focused or transmitted, the limitations in terms of sub-sampling resolution due to the size of the pixels, etc. In the device 20 of FIG. 7, the fully continuous light field 26 in (X, Y, Z) is projected to a discretized (X, Y) plane and subsampled for color and spatial intensity by the pixels 40 of the pixel array 38. A phase component (Z) can also be measured due to the provision of the diffraction grating assembly 24. This phase measurement is also a discretized subsampling of the full light field 26, this discretization being controlled by the grating design and arrangement of the diffraction grating assembly 24. The device 20 of FIG. 7 aims to retain some information lost through the discretization process inherently involved in imaging. More particularly, the phase-based nature of the diffraction grating assembly 24 is used to create a known perturbation on the phase of the wavefront which would be otherwise unmeasurable, and which happens to be angle dependent. This adds an additional and independent variable which can be used to describe the measured light field image data.

Referring still to FIG. 7, light 26 incident on the image capture device 20 may first encounter a macroscopic optical element (not shown in FIG. 7—FIG. 8, in which the device includes focusing optics disposed in front of the diffraction grating assembly) that acts to collect and focus incoming light 26. This optical element could be a lens, either transmissive or reflective, a mirror, or a fiber-optic cable. This optical element may also filter the light spectrally for the visible wavelengths by excluding infrared and ultraviolet light, or, these spectral regions may be coarsely filtered at another point in the optical stack by a separate macroscopic filter.

The ability of this optical element to focus incident light 26 is related to the light's origin distance from the focal plane of the optical element and the focusing power of the optical element. When incident light emanates from focal or hyperfocal distances, or optical infinity, its wavefront will, in general, effectively be tightly focused onto very few pixels 40. Light that is insufficiently focused, or focused too strongly, will continue to spread across the pixel array 38, leading to a curved wavefront which can expand over multiple pixels 40.

The focused light then encounters the diffraction grating assembly 24 disposed atop the imaging system (i.e., color filter array 42 and pixel array 38). In FIG. 7, the diffraction grating assembly 24 is a transmissive diffracting structure made up of two sets of orthogonally oriented diffraction gratings 28a 28b arranged to alternate in both rows and columns (checkerboard pattern). The diffraction grating assembly 24 is used to create a diffracted wavefront 36 having an angularly dependent diffractive pattern related to the curvature and rate of spread of the wavefront formed after the focusing optical element.

The diffracted wavefront 36 is further spectrally filtered by the underlying color filter array 40 into two or more discrete spectral components. The intensity of this spectrally filtered, diffracted wavefront is finally measured by the underlying pixels 40 and converted into electrical signals representative of the intensity of light captured by the pixels 40. The electrical signals can then be digitized into "raw" light field image data, typically arranged or formatted into an image frame of rows and columns of data pixels. This light field image data will generally be a collection of intensity, spectral, and angular information about the original wavefront, sampled at the pixel level, which can be summarized as follows: I=Angular Information (wavelength, diffraction grating assembly location)+2D (wavelength, pixel location). The present description discloses image processing techniques in which this light field image data is processed to reconstruct a light field image of the observed scene 22. Depending on the application, the present techniques can provide a full resolution 2D image, a 3D point cloud, a depth map/image and/or a linearly reconstructed light field image from the captured light field image data.

Returning to FIG. 9, in some implementations, the image processing method 200 can include a step 202 of parsing the pixel data according to a primary and at least one secondary colors into corresponding primary and secondary color channels. The splitting or parsing of the raw light field image data into a plurality of individual spectral or color channels forms individual sub-images. This step 202 generally occurs at the hardware readout level. The individual pixels are read, and the color filter mosaic is known. For example, for a 12-megapixel camera using standard Bayer patterning there would be a 6-megapixel green color channel, a 3-megapixel blue channel and a 3-megapixel red channel.

As mentioned above, the raw light field image data in each color channel can be expressed as a modulated function $I \sim I_{mod}$(depth info)$\times I_{base}$(2D image) including a modulating component $I_{mod}$ and a base component $I_{base}$. The base component $I_{base}$ represents the non-phase-dependent optical wavefront from which a conventional 2D image of a scene can be obtained. The modulating component $I_{mod}$ results from the phase-dependent perturbation to the incident wavefront created by the diffraction grating assembly 24. Therefore, in the case of a standard RGB Bayer pattern, the intensity profile of each color channel can be written as follows $I_N \sim I_{mod,N}$(depth info)$\times I_{base,N}$(2D image), where N=color or spectral channel, for example red (R), green (G) and blue (B)—see Equations (3) to (5). As mentioned above, the present techniques are not limited to Bayer-type patterns, but can be applied to any appropriate mosaic color pattern.

In applications where the diffraction grating assembly 24 includes multiple sets of diffraction gratings 28a, 28b (e.g., having different orientations, as in FIG. 7, different grating periods, or other different properties), the method 200 of FIG. 9 can include a step of parsing or splitting the spectral channels in accordance with the pattern of the 2D grating array into which the multiple sets of diffraction gratings 28a, 28b are arranged. For example, in FIG. 7, each one of the parsed red, green and blue color channels will be parsed once more into a first sub-channel associated with the first set of diffraction gratings 28a and a second sub-channel associated with the second set of diffraction gratings 28b. This step ensures that the data pixels of vertically oriented gratings 28a will be separated and treated independently from horizontally oriented gratings 28b. This can allow the responses of vertically and horizontally oriented gratings to be treated independently from one another, which can enhance processing speed.

In some implementations of step 202, the color channels into which the light field image data is parsed includes a main color channel and one or more secondary or auxiliary color channels. In the present description, a main color channel is a color channel having pixels in all pixel banks, such that pixels of the main color channel in adjacent pixel banks sample different spatial parts of the intensity profile of the diffracted wavefront 36 over a full cycle. As mentioned above, a pixel bank refers herein to a group of pixels 40 of the pixel array 38 that are arranged along a line which is perpendicular to the grating axis 30a, 30b of the overlying diffraction grating 28a, 28b. In some implementations, there could be two or more main channels if there are more than one color having pixels in all pixel banks.

In the device 20 of FIG. 7, the green channel is a main color channel since the green pixels are present in all pixel banks. This means that the green pixels in the $n^{th}$ pixel bank will sample a spatial phase of the intensity profile of the diffracted wavefront 36 which is phase-shifted by 180° relative to the spatial phase sampled by the green pixels in the $(n\pm1)^{th}$ pixel bank. As a result, the signal $I_G$ associated with the more densely sampled green pixels contains both in-phase and out-of-phase contributions. In other words, complimentary phases of the intensity profile of the diffracted wavefront 36 will be sampled by green pixels in alternating pixel banks. Meanwhile, the red and blue channels are secondary color channels since all the red pixels sample a same first spatial phase of the intensity profile of the diffracted wavefront 36 and all the blue pixels sample a same second spatial phase of the intensity profile of the diffracted wavefront 36, the first and second spatial phases being phase-shifted by 180° relative to each other. This means that the signals $I_R$ and $I_B$ in adjacent pixel banks are in antiphase relative to each other. Of course, other mosaic color patterns may use different color channels as main and secondary channels.

Referring still to FIG. 9, some implementations of the method 200 can also include a step 204 of using the main color channel to provide or extract a coarse raw base component, from which the local influence of the modulation imparted to the signal by the diffraction grating assembly 24 is removed.

In the example of FIG. 7, the main color channel is the more densely sampled green channel, which can sample both the major phase components from which the modulation component of the underlying diffraction pattern can be canceled. Mathematically, this step can involve extracting $I_{base,G}$ from $I_G \sim I_{mod,G} \times I_{base,G}$ by canceling $I_{mod,G}$ using the following equation:

$$I_{base,G} = \frac{1}{2}[I_G(\text{bank}_n) + I_G(\text{bank}_{n+1})]. \quad (8)$$

Alternatively, the modulating component $I_{mod,G}$ may be removed by Fourier filtering.

The method 200 can also include a step 206 of using the main color channel to provide or extract a coarse raw modulating component, which will be used to obtain coarse phase/depth information about the scene 22.

Again, in the example of FIG. 7, the main color channel is the more densely sampled green channel. Mathematically, this step can involve extracting $I_{mod,G}$ from $I_G \sim I_{mod,G} \times I_{base,G}$ by canceling $I_{base,G}$ using the following equation:

$$I_{mod,G} = \frac{1}{2}[I_G(\text{bank}_n) - I_G(\text{bank}_{n+1})]. \quad (9)$$

The modulating component $I_{mod,G}$ can provide coarse angular or phase information about the incident optical wavefront, from which light field images and/or depth maps can be generated. As described above, the modulating component $I_{mod,G}$ represents the wavefront's phase difference pixel by pixel, so that $I_{mod,G}$ contains information about the phase or spread of the incident optical wavefront 26 from the scene 22. More particularly, the modulating component $I_{mod,G}$ is the result of the tilt/angular spread of the green component of the incident wavefront 26 (e.g., caused by focusing optics in front of the diffraction grating 24 assembly—see FIG. 8) and the phase offset caused by the diffraction grating assembly 24.

Referring still to FIG. 9, the method 200 can further include a step 208 of determining the raw base components $I_{base,R}$ and $I_{base,B}$ and the raw modulating components $I_{mod,R}$ and $I_{mod,B}$ of the secondary blue and red channels can be obtained from $I_R \sim I_{mod,R} \times I_{base,R}$ and $I_B \sim I_{mod,B} \times I_{base,B}$, respectively, using $I_{base,G}$ and $I_{mod,G}$.

In some implementations, the difference between $I_G(\text{bank}_n)$ and $I_G(\text{bank}_{n+1})$ can give the sign of the modulation pattern imparted by the diffraction grating. That is, if $I_G(\text{bank}_n) < I_G(\text{bank}_{n+1})$, then it can be concluded that $\text{bank}_n$ undergoes destructive interference and $\text{bank}_{n+1}$ undergoes constructive interference, and vice versa if $I_G(\text{bank}_n) > I_G(\text{bank}_{n+1})$. Therefore, in a scenario where $I_G(\text{bank}_n) < I_G(\text{bank}_{n+1})$, with red pixels in $\text{bank}_n$ and blue pixels in $\text{bank}_{n+1}$, it can be deduced that $I_R(\text{bank}_n) < I_{base,R}$ and that $I_B(\text{bank}_{n+1}) > I_{base,B}$, such that $I_{base,R} = I_R(\text{bank}_n) + I_{mod,R}$ and $I_{base,B} = I_B(\text{bank}_{n+1}) - I_{mod,B}$. The knowledge of the sign of $[I_G(\text{bank}_n) - I_G(\text{bank}_{n+1})]$ can therefore allow to determine whether to apply a constructive or destructive phase offset to $I_R(\text{bank}_n)$ and $I_B(\text{bank}_{n+1})$ to obtain $(I_{base,R}, I_{mod,R})$ and $(I_{base,B}, \text{and } I_{mod,B})$.

To obtain the amplitude of the phase offset for red light, that is, $I_{mod,R}$ one can use a relationship between the wavefront spread of green light and the wavefront spread of red light in the image capture device (e.g., caused by the diffraction grating and focusing optics) to derive $I_{mod,R}$ from $I_{mod,G}$. Similarly, to obtain the amplitude of the phase offset for blue light, that is, $I_{mod,B}$, one can use a relationship between the wavefront spread of green light and the wavefront spread of blue light in the image capture device (e.g., caused by the diffraction grating and focusing optics) to derive $I_{mod,B}$ from $I_{mod,G}$. In some implementations, fine angular information about the wavefront spread can be obtained from the phase-shifted red and blue secondary modulating components $I_{mod,R}$ and $I_{mod,B}$, as described below. Finally, the red and blue base components can be obtained using $I_{base,R} = I_R(\text{bank}_n) + I_{mod,R}$ and $I_{base,B} = I_B(\text{bank}_{n+1}) - I_{mod}$.

Referring still to FIG. 9, the method can include a step 210 of using the raw base components $I_{base,G}$, $I_{base,R}$ and $I_{base,B}$ to reconstruct a full color 2D image of the scene 22 in similar fashions used by traditional demosaicing algorithms, for example by using the green base component $I_{base,G}$ as a normalizing basis set for $I_{base,R}$ and $I_{base,B}$. This full color 2D image represents the phase-independent raw image that would be captured by the pixel array 38 in the absence of the diffraction grating assembly 24 in front of it. This generation of the 2D image can be performed for one or more of the following non-limiting reasons: to separate depth information from 2D information for compression purposes; to be able to provide the image signal processor (ISP) with a 2D image, as is expected for display purposes; and the 2D image is one of the light field components.

Referring still to FIG. 9, in some implementations, the method 200 can include a step 212 of creating a depth map of the scene from the modulating component $I_{mod,G}$ of the main color channel, and optionally from the modulating components $I_{mod,R}$ and $I_{mod,B}$ of the secondary color channels. This step main also involve at least one color radial transfer function calibrated to provide object distance information from the modulating component of an associated one of the color channels.

In some implementations, the color radial transfer functions (CRTFs) relate the diffraction grating pattern of a diffraction grating as a function of angle to the distance of an object is away from the camera. In other words, the CRTFs may allow one to quantify the modulation imparted for two phase components of a diffraction grating, phase0 and phase180, without apriori knowledge of the scene.

For the purpose of explanation only and without being limitative to the scope of the present description, let there be considered a situation in which a camera is capturing images of a white light point-source in predetermined intervals at increasing distances away from the camera, as shown in FIG. 10. In the case of a camera without a diffraction grating, the sensor would spatio-chromatically sample the overall intensity of the white light as a function of the underlying Bayer pattern, also shown in FIG. 10. This spatio-chromatic sampling of the white light source leads to a voltage measured by each pixel roughly proportional to the spectral intensity of the white light filtered by the spectrally dependent transmission of a given color filter array component:

$$\text{Pixel}_{Red} \propto \text{Intensity}(\lambda) \times \text{Transmission}(\lambda) \quad (10.1)$$

$$\text{or Pixel}_{Red} = 2D(\text{Red}) \quad (10.2)$$

The TDM's modulated phase component will also vary from pixel bank to pixel bank:

$$\text{Pixel}_n \propto \text{Intensity}(\lambda) \times \text{Transmission}(\lambda) \times \text{Modulation}_{Phase0}(\lambda,Z) \quad (11.1)$$

$$\text{Pixel}_{n+1} \propto \text{Intensity}(\lambda) \times \text{Transmission}(\lambda) \times \text{Modulation}_{Phase180}(\lambda,Z) \quad (11.2)$$

In the case of a Bayer patterned sensor where the underlying color filters spatio-chromatically sample the light at a rate greater than the perturbation frequency caused by the diffraction grating (i.e. the pixel array having a pixel pitch along the grating axis that is smaller than the grating period), the three-color channels, as shown in FIG. 10, become:

$$\text{Pixel}_{Red} = 2D(\text{Red}) \times \text{Modulation}_{Phase0}(\lambda,Z) \quad (12.1)$$

$$\text{Pixel}_{Green1} = 2D(\text{Green}) \times \text{Modulation}_{Phase180}(\lambda,Z) \quad (12.2)$$

$$\text{Pixel}_{Green2} = 2D(\text{Green}) \times \text{Modulation}_{Phase0}(\lambda,Z) \quad (12.3)$$

$$\text{Pixel}_{Blue} = 2D(\text{Blue}) \times \text{Modulation}_{Phase180}(\lambda,Z) \quad (12.4)$$

Or, using the formalism developed above:

$$\text{Pixel}_{Red} = I_{BaseR}(Z) \times I_{ModR_{Phase0}}(\lambda,Z) \quad (13.1)$$

$$\text{Pixel}_{Green1} = I_{BaseG1}(Z) \times I_{ModR_{Phase180}}(\lambda,Z) \quad (13.2)$$

$$\text{Pixel}_{Green2} = I_{BaseG2}(Z) \times I_{ModR_{Phase0}}(\lambda,Z) \quad (13.3)$$

$$\text{Pixel}_{Blue} = I_{BaseB}(Z) \times I_{ModR_{Phase180}}(\lambda,Z) \quad (13.4)$$

The functional forms of equations 12.1 through 12.4 and 13.1 through 13.4 are shown in FIG. 11A to 11D, in which full lines represent the camera described in FIG. 10 without a diffraction grating and the dashed lines represent the same camera with a diffraction grating.

In the case of a Bayer patterned sensor, one can remove the influence of the diffraction grating on the image, or in other words, extract depth information, by having one color channel sample both phase components:

$$\text{Pixel}_n = \text{Intensity}(n) \times \text{phase0}(Z) \quad (14.1)$$

$$\text{Pixel}_{n+1} = \text{Intensity}(n+1) \times \text{phase180}(Z) \quad (14.2)$$

Figure 12B:
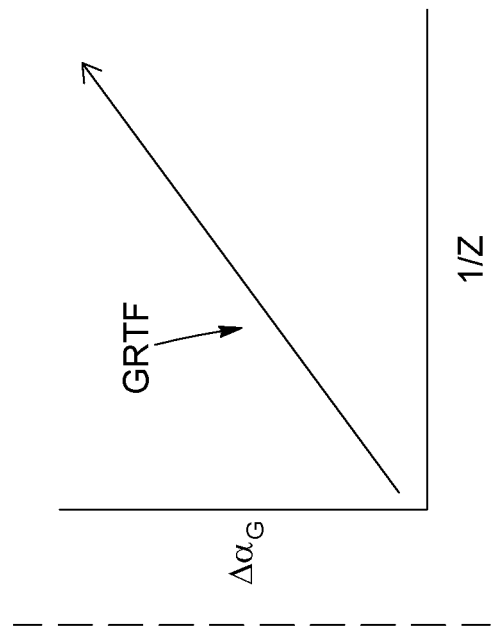
FIGS. 12A and 12B are exemplary representations of a color radial transfer function.
Figure 12A:
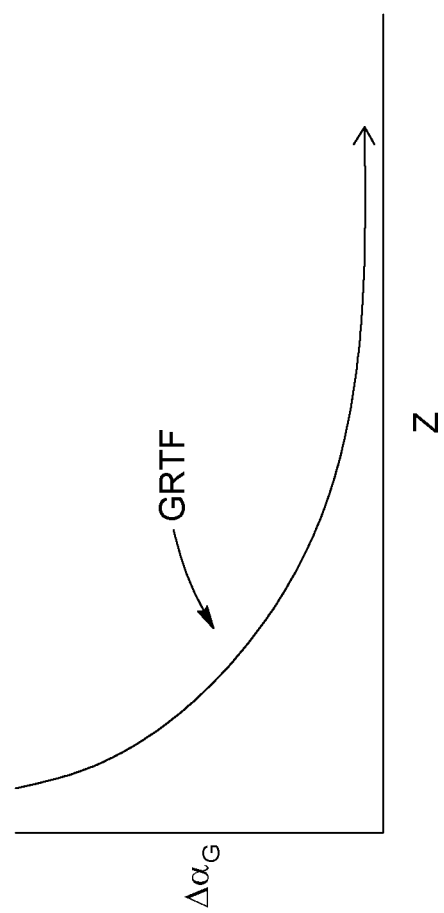

This brings the definition of a simplified main (primary) color channel radial transfer function whose functional form is shown in FIGS. 12A and 12B:

$$\Delta a(Z) = \text{Pixel}_n - \text{Pixel}_{n+1} = \Delta \text{phase}(Z) \quad (15)$$

The chromatic radial transfer function uses the difference between the two main color channel modulated components to remove intensity from the image, allowing for a normalized value to relate the other two color channels who do not have both phase components and whose intensities are therefore variable with both the 2D image as well as the diffraction grating modulation, or depth information.

Figure 13:
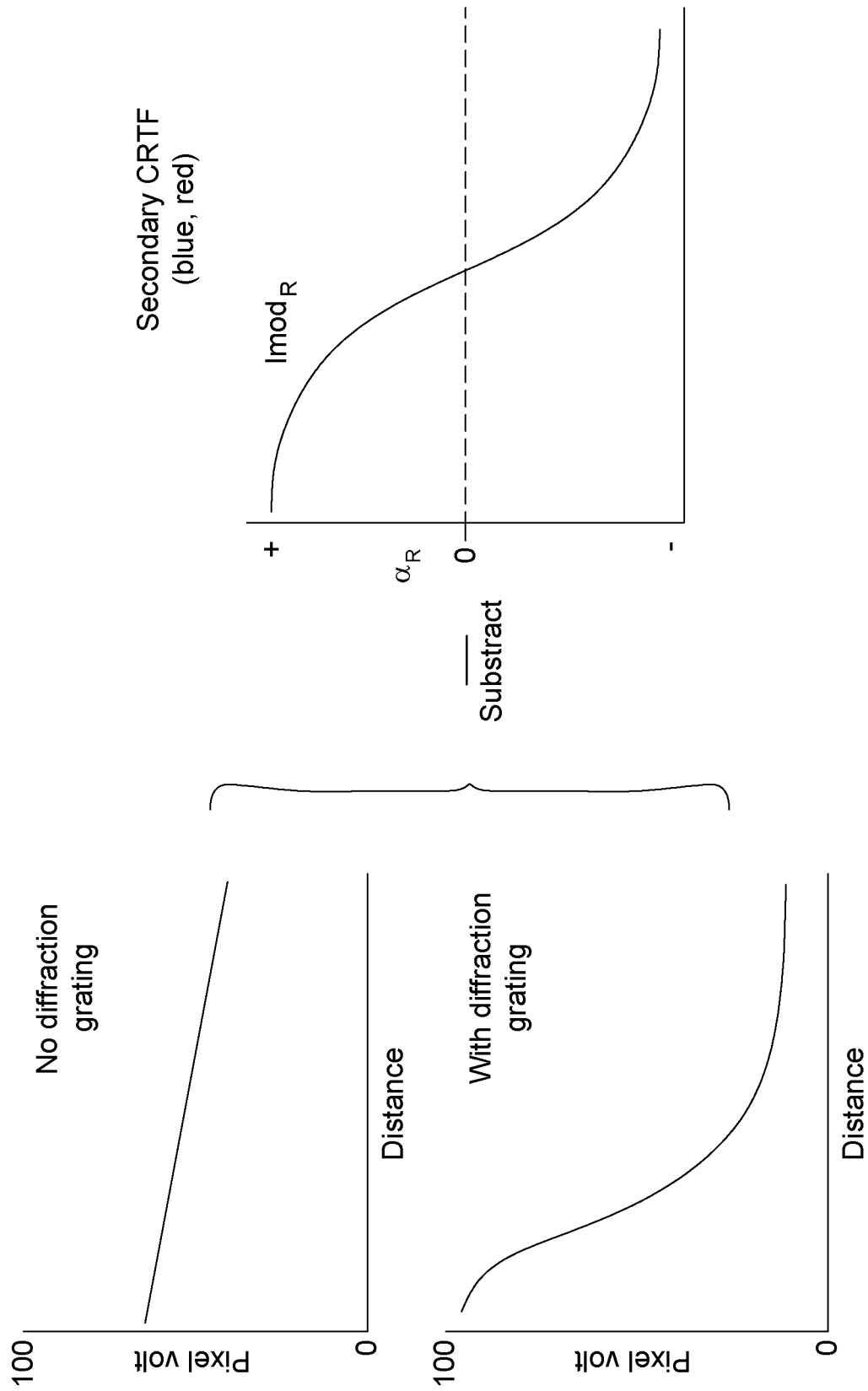
FIG. 13 illustrates a technique to obtain the secondary chromatic radial transfer functions from a knowledge of the uniform intensity of light to measure and the secondary color channel modulation as a function of angle or distance.

A similar experiment to that imagined in FIG. 10 may be performed for a secondary color channel. In this case, one can use a known uniform intensity of light to measure the secondary color channel modulation as a function of angle or distance. This will provide the secondary chromatic radial transfer functions, as shown in FIG. 13.

Figure 14:
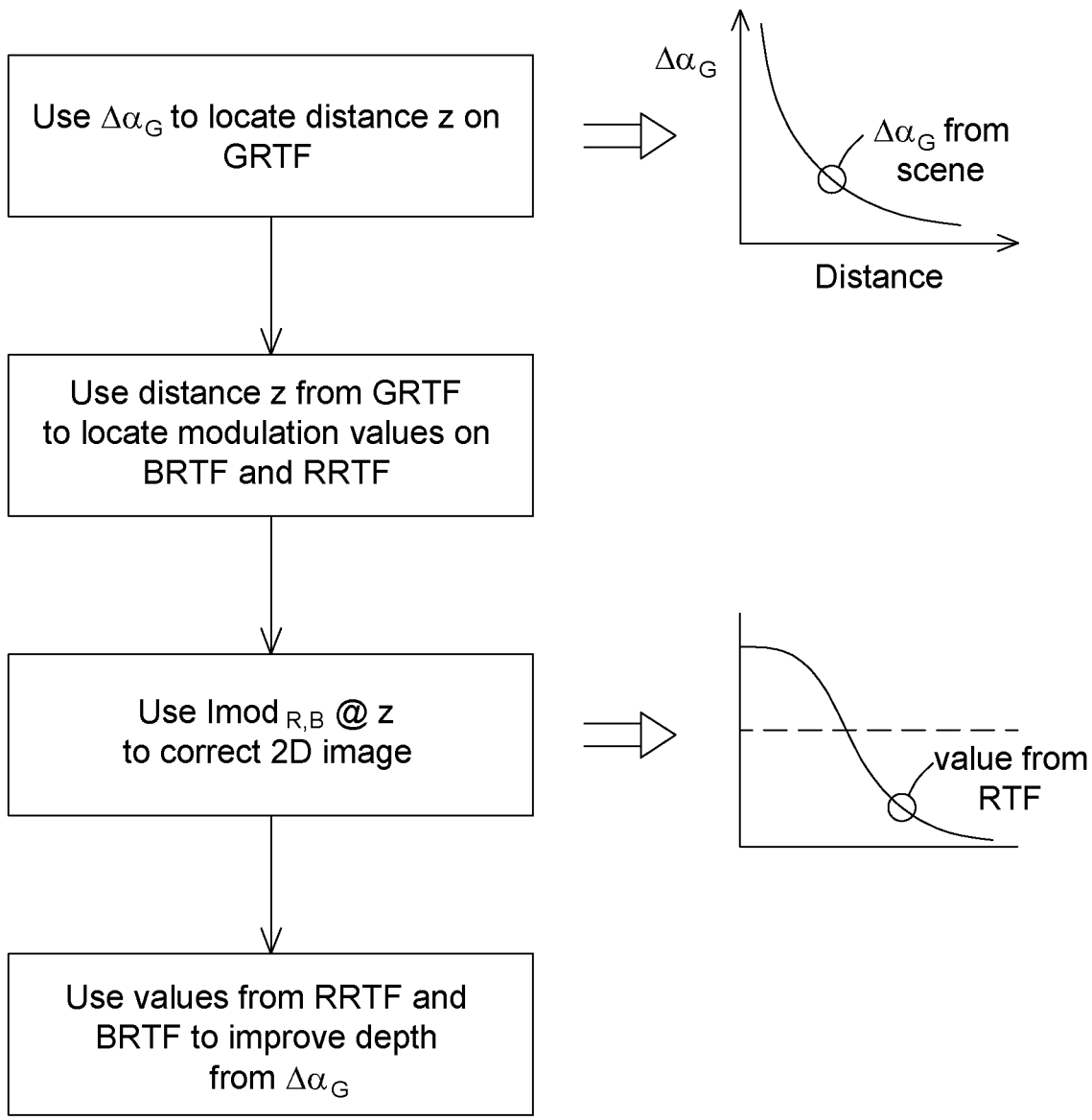
FIG. 14 illustrates a technique using the primary radial chromatic transfer function, to acquire a normalized, scene independent, value to navigate the secondary chromatic radial transfer functions.

Referring to FIG. 14, the primary radial chromatic transfer function, which works without apriori knowledge of the scene, may be used to acquire a normalized, scene independent, value to navigate the secondary chromatic radial transfer functions. Once the appropriate modulation value is known for the secondary color channels, the effect of the diffraction grating can be corrected for in the 2D image and the differences in the secondary and primary radial transfer functions values, and their respective pixel values, can be compared to further enhance depth performance.

This concept can also be extended to the lens system and its achromatic aberrations and chromatically dependent focal differences through the same processing method.

In some embodiments, the raw wavefront spread information contained in the modulating component $I_{mod,G}$ can be compared to an appropriate green radial transfer function (GRTF) to yield a coarse depth map of the scene 22. More particularly, $I_{mod,G}$ can provide relative phase information and comparison with a calibrated, sensor-specific GRTF can allow one to obtain absolute phase information from the relative phase information provided by $I_{mod,G}$. In other words, this means that the relative phase information provided by $I_{mod,G}$ can be mapped to a wavefront spread using the GRTF, this wavefront spread itself corresponding to an object position relative to the focal plane.

Optionally, the coarse depth map obtained from $I_{mod,G}$ and the GRTF can be corrected or enhanced using data from the secondary color channels (e.g., $I_{mod,R}$, $I_{mod,B}$ and their associated red and blue radial transfer functions RRTFs and BRTFs). This means that the direct comparison of the modulating components $I_{mod,G}$, $I_{mod,R}$ and $I_{mod,B}$ for the three color channels is done through measured CRTFs for each color channel in order to establish object distance.

As mentioned above, each one of the CRTFs provides an empirical fit of the directly measured wavefront spread as a function of the focal plane of the image capture device 20. Collections of these sparse data-sets of calibration images captured at varying distances from the focal plane are fit as a function of their distance from the camera and provide a direct empirical measure of the radially extended spread of the wavefront as a function of distance from the focal plane as measured by the modulating components $I_{mod,G}$ (main), and $I_{mod,R}$, and $I_{mod,B}$ (secondary) of the image and sampled by the diffraction grating assembly 24. These functions provide a method for directly mapping the measured relative phase/wavefront spread information given from $I_{mod,G}$, $I_{mod,R}$, and $I_{mod,B}$ to an absolute object distance from the image sensor, and therefore, depth (Z):

$$\text{Object}(Z) \sim RGB2D \text{ Image} \times CRTF(r, \phi, \theta, n, \lambda), \qquad (10)$$

where z is the distance from the detection plane of image capture device of a given object in the scene 22, RGB 2D Image is the raw 2D image given by $I_{base,G}$, $I_{base,R}$, and $I_{base,B}$, and the CRTF is a fitted 5D function of the polar coordinates r, $\phi$, $\theta$ from the focal plane of the image, the pixel number n (and therefore spatial location on the pixel array 38), and the incident wavelength $\lambda$. The CRTFs can be sampled in a single image for all spectral elements as sampled by the diffractive elements and imaging devices. That is, all CRTFs could be captured at once using white light and be subsampled directed by a color filter array. These functions may be tailored through the design of the diffractive grating assembly 24. The CRTFs can provide a macroscopic description of the micro sampling of the diffraction pattern resulting from the arrangement of the diffraction gratings 28 of the diffraction grating assembly 24. It is to be noted that in absolute depth implementations, one could use a general RTF or use color-specific CRTFs to increase depth accuracy.

It will be readily understood that while the implementations described above apply to circumstances where the pixel sampling frequency is greater than the period of the grating pattern, the processing method described herein may in some instance be useful in association with similar imaging devices for which the sampling frequency is equal to or less than the grating period (or in words, where the pixel array has a pixel pitch along the grating axis that is the same or greater than the grating period). In such a cases, the steps of reconstructing the 2D image may be omitted, as there is no chromatically-dependent blur pattern created in the 2D image by the action of the grating—both phase components are already included in each grating. In such embodiments the micro-chromatic dependence of the signal and associated is lost, but the macro-chromatic dependence may still be useful to provide depth information. In other words, the provision of different color channels combined with associated color radial transfer functions can provide depth information through comparisons of the different color channels to obtain their relative difference in focal position.

Of course, numerous modifications could be made to the embodiments described above without departing from the scope of the present description.

The invention claimed is:

1. A method of imaging a scene, the method comprising:
    diffracting an optical wavefront originating from the scene to generate a diffracted optical wavefront;
    detecting the diffracted optical wavefront in a near-field regime using a pixel array comprising a plurality of light-sensitive pixels each associated with a color filter, thereby obtaining pixel data, the color filters forming a color mosaic defining a primary color and one or more secondary colors arranged such that different neighboring pixels associated with the primary color detect different spatial parts of the diffracted optical wavefront over a full cycle of the diffracted optical wavefront;
    parsing the pixel data according to the primary and secondary colors into corresponding primary and secondary color channels;
    determining a main base component and a main modulating component of the diffracted optical wavefront associated with the primary color channel;
    determining, based on the main modulating component, a secondary base component of the diffracted optical wavefront associated with each secondary channel;
    reconstructing a 2D image of the scene based on the main and secondary base components; and
    creating a depth map of the scene based on at least one color radial transfer function calibrated to provide object distance information from the modulating component of an associated one of the color channels.

2. The method of claim 1, wherein the primary color channel comprises a green color channel, and the one or more secondary color channels comprise a red color channel and a blue color channel.

3. The method of claim 2, wherein the color mosaic is a Bayer pattern.

4. The method of claim 1, wherein determining the main base component and the main modulating component comprises summing and subtracting pixel data from neighboring pixel banks associated with the primary color, respectively.

5. The method of claim 1, wherein determining the secondary base component associated with each secondary color channel comprises:
    determining a secondary modulating component associated with the secondary color channel based on the main base component and the main modulating component; and
    determining the secondary base component based on the secondary modulating component.

6. The method of claim 1, wherein creating the depth map comprises creating a coarse depth map based on the main modulating component and the associated color radial transfer function.

7. The method according to claim 6, wherein creating the coarse depth map comprises:
    determining relative depth information from the main modulating component; and
    determining absolute depth information from a comparison of the relative depth information to the color radial transfer function associated with the primary color channel.

8. The method of claim 6, wherein creating the depth map comprises adjusting the coarse depth map based on the one or more secondary modulating components and the associated one or more color radial transfer functions.

9. The method of claim 1, further comprising providing the diffraction grating with a grating period that is greater than a pixel pitch of the pixel array.

10. The method of claim 9, wherein the grating period is twice the pixel pitch.

11. A non-transitory computer readable storage medium having stored thereon computer executable instructions for generating three-dimensional image data of a scene from a diffracted optical wavefront originating from the scene and having been detected in a near-field regime using a pixel array comprising a plurality of light-sensitive pixels each associated with a color filter, thereby obtaining pixel data, the color filters forming a color mosaic defining a primary color and one or more secondary colors arranged such that different neighboring pixels associated with the primary color detect different spatial parts of the diffracted optical wavefront over a full cycle of the diffracted optical wavefront, the computer executable instructions, when executed by a processor having received the pixel data, cause the processor to perform the following steps:

parsing the pixel data according to the primary and secondary colors into corresponding primary and secondary color channels;

determining a main base component and a main modulating component of the diffracted optical wavefront associated with the primary color channel;

determining, based on the main modulating component, a secondary base component of the diffracted wavefront associated with each secondary channel;

reconstructing a 2D image of the scene based on the main and secondary base components; and creating a depth map of the scene based on at least one color radial transfer function calibrated to provide object distance information from the modulating component of an associated one of the color channels.

12. The non-transitory computer readable storage medium of claim 11, wherein the primary color channel comprises a green color channel, and the one or more secondary color channels comprise a red color channel and a blue color channel.

13. The non-transitory computer readable storage medium of claim 12, wherein the color mosaic is a Bayer pattern.

14. The non-transitory computer readable storage medium of claim 11, wherein determining the main base component and the main modulating component comprises summing and subtracting pixel data from neighboring pixel banks associated with the primary color, respectively.

15. The non-transitory computer readable storage medium of claim 11, wherein determining the secondary base component associated with each secondary color channel comprises:

determining a secondary modulating component associated with the secondary color channel based on the main base component and the main modulating component; and determining the secondary base component based on the secondary modulating component.

16. The non-transitory computer readable storage medium of claim 11, wherein creating the depth map comprises creating a coarse depth map based on the main modulating component and the associated color radial transfer function.

17. The non-transitory computer readable storage medium according to claim 16, wherein creating the coarse depth map comprises:

determining relative depth information from the main modulating component; and determining absolute depth information from a comparison of the relative depth information to the color radial transfer function associated with the primary color channel.

18. The non-transitory computer readable storage medium of claim 16, wherein creating the depth map comprises adjusting the coarse depth map based on the one or more secondary modulating components and the associated one or more color radial transfer functions.

19. The non-transitory computer readable storage medium of claim 11, wherein the diffraction grating has a grating period that is greater than a pixel pitch of the pixel array.

20. The non-transitory computer readable storage medium of claim 19, wherein the grating period is twice the pixel pitch.

21. A system for imaging a scene, the system comprising:

a diffracting grating configured to diffract an optical wavefront originating from the scene to generate a diffracted optical wavefront;

a pixel array comprising a plurality of light-sensitive pixels configured to detect the diffracted optical wavefront in a near-field regime, thereby obtaining pixel data;

a color filter array interposed between the diffraction grating and the pixel array, the color filter array comprising a plurality of color filters each associated with a corresponding one of the plurality of light-sensitive pixels and forming a color mosaic defining a primary color and one or more secondary colors arranged such that different neighboring pixels associated with the primary color detect different spatial parts of the diffracted optical wavefront over a full cycle of the diffracted optical wavefront; and a processor configured to:

receive the pixel data from the pixel array;

parse the pixel data according to the primary and secondary colors into corresponding primary and secondary color channels;

determine a main base component and a main modulating component of the diffracted optical wavefront associated with the primary color channel;

determine, based on the main modulating component, a secondary base component of the diffracted optical wavefront associated with each secondary channel;

reconstruct a 2D image of the scene based on the main and secondary base components; and create a depth map of the scene using at least one color radial transfer function calibrated to provide object distance information from the modulating component of an associated one of the color channels.

22. The system of claim 21, wherein the diffraction grating comprises a transmissive binary phase grating.

23. The system of claim 21, wherein the diffraction grating has a grating period, and wherein the pixel array has a pixel pitch that is smaller than grating period.

24. The system of claim 21, wherein the color filters comprises red filters, green filters, and blue filters, wherein the color mosaic is a Bayer pattern, and wherein the primary color channel comprises a green channel, and the one or more secondary color channels comprise a red channel and a blue channel.

25. The system of claim 21, wherein the processor is configured to determine the main base component and the main modulating component by summing and subtracting pixel data from neighboring pixel banks associated with the primary color, respectively.

* * * * *